United States Patent [19]
Young

[11] Patent Number: 5,921,878
[45] Date of Patent: Jul. 13, 1999

[54] ROLLER CHAIN DRIVE SYSTEM HAVING IMPROVED NOISE CHARACTERISTICS

[75] Inventor: James D. Young, Chesaning, Mich.

[73] Assignee: Cloyes Gear and Products, Inc., Mentor, Ohio

[21] Appl. No.: 08/879,157

[22] Filed: Jun. 19, 1997

Related U.S. Application Data

[60] Provisional application No. 60/021,107, Jul. 3, 1996.

[51] Int. Cl.$^6$ ........................................ F16H 55/12
[52] U.S. Cl. ............................... 474/160; 474/156
[58] Field of Search ........................ 474/160, 153, 474/156, 157, 148, 152, 164, 162; 74/89.21, 665 GE, 37

[56] References Cited

U.S. PATENT DOCUMENTS

| | | |
|---|---|---|
| Re. 30,018 | 6/1979 | Clemens et al. . |
| 320,734 | 6/1885 | Whiteley . |
| 536,813 | 4/1895 | MacPhail et al. . |
| 601,333 | 3/1898 | Barrett et al. . |
| 698,991 | 4/1902 | Morse . |
| 717,976 | 1/1903 | Dodge . |
| 984,509 | 2/1911 | Crowder . |
| 1,630,313 | 5/1927 | Rorabeck . |
| 1,808,369 | 6/1931 | Munroe . |
| 2,382,740 | 8/1945 | Noffsinger . |
| 2,934,200 | 4/1960 | Fletcher et al. . |
| 3,130,791 | 4/1964 | Schmidt . |
| 3,194,609 | 7/1965 | Thurlow . |
| 3,298,406 | 1/1967 | Erickson . |
| 3,377,875 | 4/1968 | Sand . |
| 3,448,629 | 6/1969 | Pfrank et al. . |
| 3,495,468 | 2/1970 | Griffel . |
| 3,604,755 | 9/1971 | Krekeler . |
| 3,824,869 | 7/1974 | Murphy . |
| 3,956,943 | 5/1976 | Yamasaki . |
| 4,016,772 | 4/1977 | Clemens et al. . |
| 4,036,071 | 7/1977 | McKnight et al. . |
| 4,089,406 | 5/1978 | Teske et al. . |
| 4,099,423 | 7/1978 | Mullins . |
| 4,116,081 | 9/1978 | Luttrell et al. . |
| 4,168,634 | 9/1979 | Griffel . |
| 4,174,642 | 11/1979 | Martin et al. . |
| 4,181,033 | 1/1980 | Nagano . |
| 4,200,000 | 4/1980 | Fluehmann . |
| 4,207,777 | 6/1980 | Fluehmann . |
| 4,274,184 | 6/1981 | Nordtvedt . |
| 4,294,132 | 10/1981 | Matusz . |
| 4,348,200 | 9/1982 | Terada ..................................... 474/160 |
| 4,378,965 | 4/1983 | Ishii et al. . |

(List continued on next page.)

FOREIGN PATENT DOCUMENTS 851099   1/1940   France .

OTHER PUBLICATIONS

International Standard ISO 606:1994(E), entitled "Short--pitch transmission precision roller chains and chain wheels." (19 pgs.).

DE–vol. 46, Mechanical Design and Synthesis ASME 1992, entitled "On The Dynamic Analysis Of Roller Chain Drives: Part 1—Theory." (pp. 431–439).

*Primary Examiner*—John A. Jeffery
*Assistant Examiner*—Marcus Charles
*Attorney, Agent, or Firm*—Fay, Sharpe, Beall, Fagan, Minnich & McKee, L.L.P.

[57] ABSTRACT

A unidirectional roller chain sprocket for use primarily in automotive engine chain drive applications which incorporates an asymmetrical tooth for improved noise reduction. The asymmetrical tooth profile incorporates a flank flat which is tangent to an engaging flank radius and a first root radius. The asymmetrical tooth profile also incorporates one or more inclined root surfaces which provide tooth space clearance for maintaining the chain rollers in hard contact with the root surface in the sprocket wrap. The asymmetrical tooth profile further incorporates pitch mismatch wherein the sprocket chordal pitch is less than the chain chordal pitch to facilitate a "staged" roller-tooth contact as a roller moves into full mesh from an initial tangential impact at the flank flat.

24 Claims, 22 Drawing Sheets

U.S. PATENT DOCUMENTS

| | | |
|---|---|---|
| 4,401,420 | 8/1983 | Kasuya et al. . |
| 4,492,030 | 1/1985 | Beerens . |
| 4,521,207 | 6/1985 | Husted . |
| 4,522,611 | 6/1985 | Hiatt . |
| 4,531,926 | 7/1985 | Reeves, Jr. . |
| 4,559,028 | 12/1985 | Reeves, Jr. . |
| 4,571,218 | 2/1986 | Reeves, Jr. . |
| 4,645,475 | 2/1987 | Husted ................................ 474/164 X |
| 4,653,340 | 3/1987 | LaBate . |
| 4,758,209 | 7/1988 | Ledvina . |
| 4,813,916 | 3/1989 | Valin . |
| 4,889,521 | 12/1989 | Nagano . |
| 4,911,032 | 3/1990 | Steele et al. . |
| 4,915,604 | 4/1990 | Nagai . |
| 4,915,675 | 4/1990 | Avramidis . |
| 4,969,371 | 11/1990 | Allen . |
| 5,022,280 | 6/1991 | Boiko et al. . |
| 5,073,151 | 12/1991 | Nagano . |
| 5,123,878 | 6/1992 | Nagano . |
| 5,133,695 | 7/1992 | Kobayashi . |
| 5,154,674 | 10/1992 | Avramidis et al. . |
| 5,162,022 | 11/1992 | Kobayashi . |
| 5,163,826 | 11/1992 | Cozens . |
| 5,318,483 | 6/1994 | Reid et al. . |
| 5,397,278 | 3/1995 | Suzuki et al. . |
| 5,437,582 | 8/1995 | Romano . |
| 5,458,543 | 10/1995 | Kobayashi ............................ 474/160 |
| 5,503,598 | 4/1996 | Neuer et al. . |

ISO

| Z | A | α (MIN) | α (MAX) | γ (MAX) | γ (MIN) |
|---|---|---|---|---|---|
| 18 | 20.000 | 115.00 | 135.00 | 22.500 | 12.500 |
| 19 | 18.947 | 115.26 | 135.26 | 22.895 | 12.895 |
| 20 | 18.000 | 115.50 | 135.50 | 23.250 | 13.250 |
| 21 | 17.143 | 115.71 | 135.71 | 23.571 | 13.571 |
| 22 | 16.364 | 115.91 | 135.91 | 23.864 | 13.864 |
| 23 | 15.652 | 116.09 | 136.09 | 24.130 | 14.130 |
| 24 | 15.000 | 116.25 | 136.25 | 24.375 | 14.375 |
| 25 | 14.400 | 116.40 | 136.40 | 24.600 | 14.600 |
| 26 | 13.846 | 116.54 | 136.54 | 24.808 | 14.808 |
| 27 | 13.333 | 116.67 | 136.67 | 25.000 | 15.000 |
| 28 | 12.857 | 116.79 | 136.79 | 25.179 | 15.179 |
| 29 | 12.414 | 116.90 | 136.90 | 25.345 | 15.345 |
| 30 | 12.000 | 117.00 | 137.00 | 25.500 | 15.500 |

Fig. 20
PRIOR ART

ASYMMETRICAL

| | | 1 | | 2 | | 3 | |
|---|---|---|---|---|---|---|---|
| Z | A | β (MAX) | γ (MIN) | β (MAX) | γ (MIN) | β (MAX) | γ (MIN) |
| 18 | 20.000 | 73.75 | 6.25 | 80.00 | 0 | 82.00 | -2 |
| 19 | 18.947 | 74.08 | 6.45 | 80.53 | 0 | 82.53 | -2 |
| 20 | 18.000 | 74.38 | 6.63 | 81.00 | 0 | 83.00 | -2 |
| 21 | 17.143 | 74.64 | 6.79 | 81.43 | 0 | 83.43 | -2 |
| 22 | 16.364 | 74.89 | 6.93 | 81.82 | 0 | 83.82 | -2 |
| 23 | 15.652 | 75.11 | 7.07 | 82.17 | 0 | 84.17 | -2 |
| 24 | 15.000 | 75.31 | 7.19 | 82.50 | 0 | 84.50 | -2 |
| 25 | 14.400 | 75.50 | 7.30 | 82.80 | 0 | 84.80 | -2 |
| 26 | 13.846 | 75.67 | 7.40 | 83.08 | 0 | 85.08 | -2 |
| 27 | 13.333 | 75.83 | 7.50 | 83.33 | 0 | 85.33 | -2 |
| 28 | 12.857 | 75.98 | 7.59 | 83.57 | 0 | 85.57 | -2 |
| 29 | 12.414 | 76.12 | 7.67 | 83.79 | 0 | 85.79 | -2 |
| 30 | 12.000 | 76.25 | 7.75 | 84.00 | 0 | 86.00 | -2 |

Fig. 21

ROLLER CHAIN DRIVE SYSTEM HAVING IMPROVED NOISE CHARACTERISTICS

CROSS REFERENCE TO RELATED APPLICATIONS

This application claims the benefit of U.S. Provisional Patent Application No. 06/021,107, filed Jul. 3, 1996.

BACKGROUND OF THE INVENTION

The present invention relates to the automotive timing chain art. It finds particular application in conjunction with a unidirectional roller chain sprocket for use in automotive camshaft drive applications and will be described with particular reference thereto. However, the present invention may also find application in conjunction with other types of chain drive systems and applications where reducing the noise levels associated with chain drives is desired.

Roller chain sprockets for use in camshaft drives of automotive engines are typically manufactured according to ISO (International Organization for Standardization) standard 606:1994(E). The ISO-606 standard specifies requirements for short-pitch precision roller chains and associated chain wheels or sprockets.

FIG. 1 illustrates a symmetrical tooth space form for an ISO-606 compliant sprocket. The tooth space has a continuous fillet or root radius $R_i$ from one tooth flank (i.e., side) to the adjacent tooth flank as defined by the roller seating angle $\alpha$. The flank radius $R_f$ is tangent to the roller seating radius $R_i$ at the tangency point TP. A chain with a link pitch P has rollers of diameter $D_1$ in contact with the tooth spaces. The ISO sprocket has a chordal pitch also of length P, a root diameter $D_2$, and Z number of teeth. The pitch circle diameter PD, tip or outside diameter OD, and tooth angle A (equal to 360°/Z) further define the ISO-606 compliant sprocket. The maximum and minimum roller seating angle $\alpha$ is defined as:

$$\alpha_{max}=(140°-90°)/Z \text{ and } \alpha_{min}=(120°-90°)/Z$$

With reference to FIG. 2, an exemplary ISO-606 compliant roller chain drive system 10 rotates in a clockwise direction as shown by arrow 11. The chain drive system 10 includes a drive sprocket 12, a driven sprocket 14 and a roller chain 16 having a number of rollers 18. The sprockets 12, 14, and chain 16 each generally comply with the ISO-606 standard.

The roller chain 16 engages and wraps about sprockets 12 and 14 and has two spans extending between the sprockets, slack strand 20 and taut strand 22. The roller chain 16 is under tension as shown by arrows 24. The taut strand 22 may be guided from the driven sprocket 14 to the drive sprocket 12 with a chain guide 26. A first roller 28 is shown at the onset of meshing at a 12 o'clock position on the drive sprocket 12. A second roller 30 is adjacent to the first roller 28 and is the next roller to mesh with the drive sprocket 12.

Chain drive systems have several components of undesirable noise. A major source of roller chain drive noise is the sound generated as a roller leaves the span and collides with the sprocket during meshing. The resultant impact noise is repeated with a frequency generally equal to that of the frequency of the chain meshing with the sprocket. The loudness of the impact noise is a function of the impact energy ($E_A$) that must be absorbed during the meshing process. The impact energy absorbed is related to engine speed, chain mass, and the impact velocity between the chain and the sprocket at the onset of meshing. The impact velocity is affected by the chain-sprocket engagement geometry, of which an engaging flank pressure angle $\gamma$ is a factor, where:

$$E_A = \frac{wP}{2000}V_A^2;$$

$$V_A = \frac{\pi nP}{30000}\sin\left(\frac{360}{Z}+\gamma\right);$$

$$\gamma = \frac{180-A-\alpha}{2}; \text{ and}$$

$E_A$=Impact Energy [N·m]
$V_A$=Roller Impact Velocity [m/s]
$\gamma$=Engaging Flank Pressure Angle
n=Engine Speed [RPM]
w=Chain Mass [Kg]
Z=Number of Sprocket Teeth
A=Tooth Angle (360°/Z)
$\alpha$=Roller Seating Angle
P=Chain Pitch (Chordal Pitch)

The impact energy equation presumes the chain drive kinematics will conform generally to a quasi-static analytical model and that the roller-sprocket driving contact will occur at a tangency point TP (FIG. 3) for the flank and root radii as the sprocket collects a roller from the span.

As shown in FIG. 3, the pressure angle $\gamma$ is defined as the angle between a line A extending from the center of the engaging roller 28, when it is contacting the engaging tooth flank at the tangency point TP, through the center of the flank radius $R_f$, and a line B connecting the centers of the fully seated roller 28, when it is seated on root diameter $D_2$, and the center of the next meshing roller 30 as if it were also seated on root diameter $D_2$ in its engaging tooth space. The roller seating angles $\alpha$ and pressure angles $\gamma$ listed in FIG. 20 are calculated from the equations defined above. It should be appreciated that $\gamma$ is a minimum when $\alpha$ is a maximum. The exemplary 18-tooth ISO compliant sprocket 12 of FIG. 3 will have a pressure angle $\gamma$ in the range of 12.5° to 22.5° as listed in the table of FIG. 20.

FIG. 3 also shows the engagement path (phantom rollers) and the driving contact position of roller 28 (solid) as the drive sprocket 12 rotates in the direction of arrow 11. It is assumed that the chain drive kinematics generally conform to, and can be represented by a quasi-static analytical model, and that the drive contact occurs at the tangency point TP. FIG. 3 depicts the theoretical case with chain roller 27 seated on root diameter $D_2$ of a maximum material sprocket with both chain pitch and sprocket chordal pitch equal to theoretical pitch P. For this theoretical case, the noise occurring at the onset of roller engagement has a radial component $F_{Ir}$ as a result of roller 28 colliding with the root surface $R_i$ and a tangential component $F_{It}$ generated as the same roller 28 collides with the engaging tooth flank at point TP as the roller moves into driving contact. It is believed that the radial impact occurs first, with the tangential impact following nearly simultaneously. Roller impact velocity $V_A$ is shown to act through, and is substantially normal to, engaging flank tangent point TP with roller 28 in driving contact at point TP.

The impact energy ($E_A$) equation accounts only for a tangential roller impact during meshing. The actual roller engagement, presumed to have tangential and radial impacts (occurring in any order), would therefore seem to be at variance with the impact energy ($E_A$) equation. The application of this quasi-static model, which is beneficially used as a directional tool, permits an analysis of those features that may be modified to reduce the impact energy occurring during the tangential roller-sprocket collision at the onset of meshing. The radial roller-sprocket collision during the engagement process, and its effect on noise levels, must be evaluated apart from the impact energy ($E_A$) equation. In the present invention, this evaluation took the form of firing engine NVH testing that compared the noise levels of sprockets having the standard ISO-606 tooth profile to sprockets having asymmetrical profiles.

Under actual conditions as a result of feature dimensional tolerances, there will normally be a pitch mismatch between the chain and sprocket, with increased mismatch as the components wear in use. This pitch mismatch serves to move the point of meshing impact, with the radial collision still occurring at the root surface $R_i$ but not necessarily at $D_2$. The tangential collision will normally be in the proximity of point TP, but this contact could take place high up on the engaging side of root radius $R_i$ or even radially outward from point TP on the engaging flank radius $R_f$ as a function of the actual chain-sprocket pitch mismatch.

Reducing the engaging flank pressure angle γ reduces the meshing noise levels associated with roller chain drives, as predicted by the impact energy ($E_A$) equation set forth above. It is feasible but not recommended to reduce the pressure angle γ while maintaining a symmetrical tooth profile, which could be accomplished by simply increasing the roller seating angle α, effectively decreasing the pressure angle for both flanks. This profile as described requires that a worn chain would, as the roller travels around a sprocket wrap (discussed below), interface with a much steeper incline and the rollers would necessarily ride higher up on the coast flank prior to leaving the wrap.

Another source of chain drive noise is the broadband mechanical noise generated in part by shaft torsional vibrations and slight dimensional inaccuracies between the chain and the sprockets. Contributing to a greater extent to the broadband mechanical noise level is the intermittent or vibrating contact that occurs between a worn roller chain and sprocket as the rollers travel around the sprocket wrap. In particular, ordinary chain drive system wear comprises sprocket tooth face wear and chain wear. The chain wear is caused by bearing wear in the chain joints and can be characterized as pitch elongation. It is believed that a worn chain meshing with an ISO standard sprocket will have only one roller in driving contact and loaded at a maximum loading condition.

With reference again to FIG. 2, driving contact at maximum loading occurs as a roller enters a drive sprocket wrap 32 at engagement. Engaging roller 28 is shown in driving contact and loaded at a maximum loading condition. The loading on roller 28 is primarily meshing impact loading and the chain tension loading. The next several rollers in the wrap 32 forward of roller 28 share in the chain tension loading, but at a progressively decreasing rate. The loading of roller 28 (and to a lesser extent for the next several rollers in the wrap) serves to maintain the roller in solid or hard contact with the sprocket root surface 34.

A roller 36 is the last roller in the drive sprocket wrap 32 prior to entering the slack strand 20. Roller 36 is also in hard contact with drive sprocket 12, but at some point higher up (e.g., radially outwardly) on the root surface 34. With the exception of rollers 28 and 36, and the several rollers forward of roller 28 that share the chain tension loading, the remaining rollers in the drive sprocket wrap 32 are not in hard contact with the sprocket root surface 34, and are therefore free to vibrate against the sprocket root surfaces as they travel around the wrap, thereby contributing to the generation of unwanted broadband mechanical noise.

A roller 38 is the last roller in a sprocket wrap 40 of the driven sprocket 14 before entering the taut strand 22. The roller 38 is in driving contact with the sprocket 14. As with the roller 36 in the drive sprocket wrap 32, a roller 42 in the sprocket wrap 40 is in hard contact with a root radius 44 of driven sprocket 14, but generally not at the root diameter.

It is known that providing pitch line clearance (PLC) between sprocket teeth promotes hard contact between the chain rollers and sprocket in the sprocket wrap as the roller chain wears. The amount of pitch line clearance added to the tooth space defines a length of a short arc that is centered in the tooth space and forms a segment of the root diameter $D_2$. The root fillet radius $R_i$ is tangent to the flank radius $R_f$ and the root diameter arc segment. The tooth profile is still symmetrical, but $R_i$ is no longer a continuous fillet radius from one flank radius to the adjacent flank radius. This has the effect of reducing the broadband mechanical noise component of a chain drive system. However, adding pitch line clearance between sprocket teeth does not reduce chain drive noise caused by the roller-sprocket collision at impact.

Chordal action, or chordal rise and fall, is another important factor affecting the operating smoothness and noise levels of a chain drive, particularly at high speeds. Chordal action occurs as the chain enters the sprocket from the taut span during meshing and it can cause a movement of the chain in a direction perpendicular to the chain travel but in the same plane as the chain and sprockets. This chain motion resulting from chordal action will contribute an objectionable noise level component to the meshing noise levels, so it is therefore beneficial to reduce chordal action inherent in a roller chain drive.

FIGS. 4a and 4b illustrate the chordal action for an 18-tooth, ISO compliant sprocket having a chordal pitch of 9.525 mm. Chordal rise 45 may conventionally be defined as the displacement of the chain centerline as the sprocket rotates through an angle A/2, where:

$$\text{Chordal rise} = r_p - r_c = r_p[1 - \cos(180°/Z)]$$

where $r_c$ is the chordal radius, or the distance from the sprocket center to a pitch chord of length P; $r_p$ is the actual theoretical pitch radius; and Z is the number of sprocket teeth.

It is known that a short pitch chain provides reduced chordal action compared to a longer pitch chain having a similar pitch radius. FIGS. 4a and 4b show only the drive sprocket and assume a driven sprocket (not shown) also having 18-teeth and in phase with the drive sprocket shown. In other words, at T=0 (FIG. 4a), both sprockets will have a tooth center at the 12 o'clock position. Accordingly, this chain drive arrangement under quasi-static conditions will have a top or taut strand that will move up and down in a uniform manner a distance equal to that of the chordal rise. At T=0, roller 46 is at the onset of meshing, with chordal pitch P horizontal and in line with taut strand 22. At T=0+(A/2), (FIG. 4b), roller 46 has moved to the 12 o'clock position.

For many chain drives, the drive and driven sprockets will be of different sizes and will not necessarily be in phase. The chain guide 26 (FIG. 2) has the primary purpose to control chain strand vibration in the taut span. The geometry of the guide-chain interface also defines the length of free span chain over which chordal rise and fall is allowed to articulate. FIG. 5 is an enlarged view of FIG. 2 showing the first roller 28 at the onset of engagement and a second roller 30 as the next roller about to mesh with sprocket 12. In this example, the chain guide 26 controls and guides the taut strand 22 except for five (5) unsupported link pitches extending between the chain guide 26 and the engaging roller 28. The taut strand 22 is horizontal when the roller 28 is at the 12 o'clock position.

With reference to FIGS. 6 and 7, the drive sprocket 12 is rotated in a clockwise direction to advance roller 28 to a new angular position (A/2)+ω, determined by the instant of sprocket engagement of roller 30. Roller 28 is considered to be seated and in hard contact with the root surface at $D_2$ at the onset of meshing of roller 30. As shown in FIG. 6, a straight line is assumed for the chain span from roller 28 to a chain pin center 48, about which the unsupported span from pin 48 to engaging roller 30 is considered to rotate. The location and chain-interfacing contour of the chain guide 26 will determine the number of free span pitches about which articulation will take place as a result of the chordal rise and fall during the roller meshing process.

As best seen in FIG. 7, assuming that rollers 28 and 30 are in hard contact with the sprocket root surfaces at points 52, 50, respectively, the chordal rise is the perpendicular displacement of the center of roller 30 (located on the pitch diameter PD) from the taut span 22 path as it moves from its initial meshing position shown to the position presently occupied by roller 28.

Accordingly, it is desirable to develop a new and improved roller chain drive system which meets the above-stated needs and overcomes the foregoing disadvantages and others while providing better and more advantageous results.

SUMMARY OF THE INVENTION

In accordance with one aspect of the present invention, a roller chain sprocket is disclosed. The roller chain sprocket includes a plurality of sprocket teeth each having an engaging flank and a coast flank, a first tooth engaging flank cooperating with a second tooth coast flank to define an asymmetrical tooth space for receiving a roller associated with a roller chain, and a flank flat positioned within the asymmetrical tooth space to permit a staged impact between the roller and the sprocket, wherein the staged impact includes an initial tangential impact between the roller and the sprocket along the flank flat followed by a subsequent radial impact between the roller and the sprocket which occurs a predetermined time period after the initial tangential impact.

In accordance with another aspect of the present invention, a unidirectional roller chain drive system is disclosed. The unidirectional roller chain drive system includes a driving sprocket having a plurality of sprocket teeth with each tooth having an engaging flank and a coast flank, wherein the engaging flanks cooperate with the coast flanks of adjacent teeth to define asymmetrical tooth spaces between the sprocket teeth. A driven sprocket has a plurality of sprocket teeth with each tooth having an engaging flank and a coast flank, wherein the engaging flanks cooperate with the coast flanks of adjacent teeth to define asymmetrical tooth spaces between the sprocket teeth. A roller chain has rollers in engaging contact with the driving sprocket and the driven sprocket. Each of the driving and driven sprocket teeth has a flank flat positioned along the respective engaging flanks to permit staged impacts between the rollers and the sprockets, wherein the staged impacts include initial tangential impacts between the rollers and the sprockets along the flank flats followed by subsequent radial impacts between the rollers and the sprockets which occur a predetermined time period after the initial tangential impacts occur.

In accordance with yet another aspect of the present invention, method of engaging a roller chain with a sprocket is disclosed. The sprocket has a plurality of sprocket teeth including an engaging flank which cooperates with an adjacent tooth coast flank to define an asymmetrical tooth space for receiving a roller associated with the roller chain, and includes a flank flat positioned within the asymmetrical tooth space. The method includes rotating the sprocket in a first direction so that the roller tangentially impacts the engaging flank along the flank flat, and continuing to rotate the sprocket in the first direction so that the roller radially impacts a root surface of the sprocket a predetermined time after impacting the engaging flank thus spreading the impact energy over a predetermined period of time and reducing meshing noise levels.

One advantage of the present invention is the provision of a roller chain sprocket which incorporates a flank flat on an engaging tooth surface.

Another advantage of the present invention is the provision of a roller chain sprocket which incorporates pitch mismatch between the sprocket and roller chain.

Still another advantage of the present invention is the provision of a roller chain sprocket which incorporates an inclined root surface on an engaging flank, a coast flank, or both an engaging flank and a coast flank.

Yet another advantage of the present invention is the provision of a roller chain sprocket which minimizes impact noise generated by a roller-sprocket collision during meshing.

A further advantage of the present invention is the provision of a roller chain sprocket which minimizes broadband mechanical noise generated by unloaded rollers in a sprocket wrap.

A still further advantage of the present invention is the provision of a roller chain sprocket which provides a "staged" roller impact wherein a tangential impact occurs first followed by a radial impact.

Yet a further advantage of the present invention is the provision of a roller chain sprocket which spreads roller engagement over a significant time interval to provide for a more gradual load transfer, thereby minimizing roller-sprocket impact and the inherent noise generated therefrom.

Further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

FIG. 20 is a table listing roller seating angles $\alpha$ and pressure angles $\gamma$ for a number of different ISO-606 compliant roller chain sprockets; and FIG. 21 is a table listing the maximum $\beta$ angles and the corresponding minimum pressure angles $\gamma$ for three families of asymmetrical tooth profiles (1–3) of varying sprocket sizes.

DETAILED DESCRIPTION OF THE PREFERRED EMBODIMENTS

Figure 8:
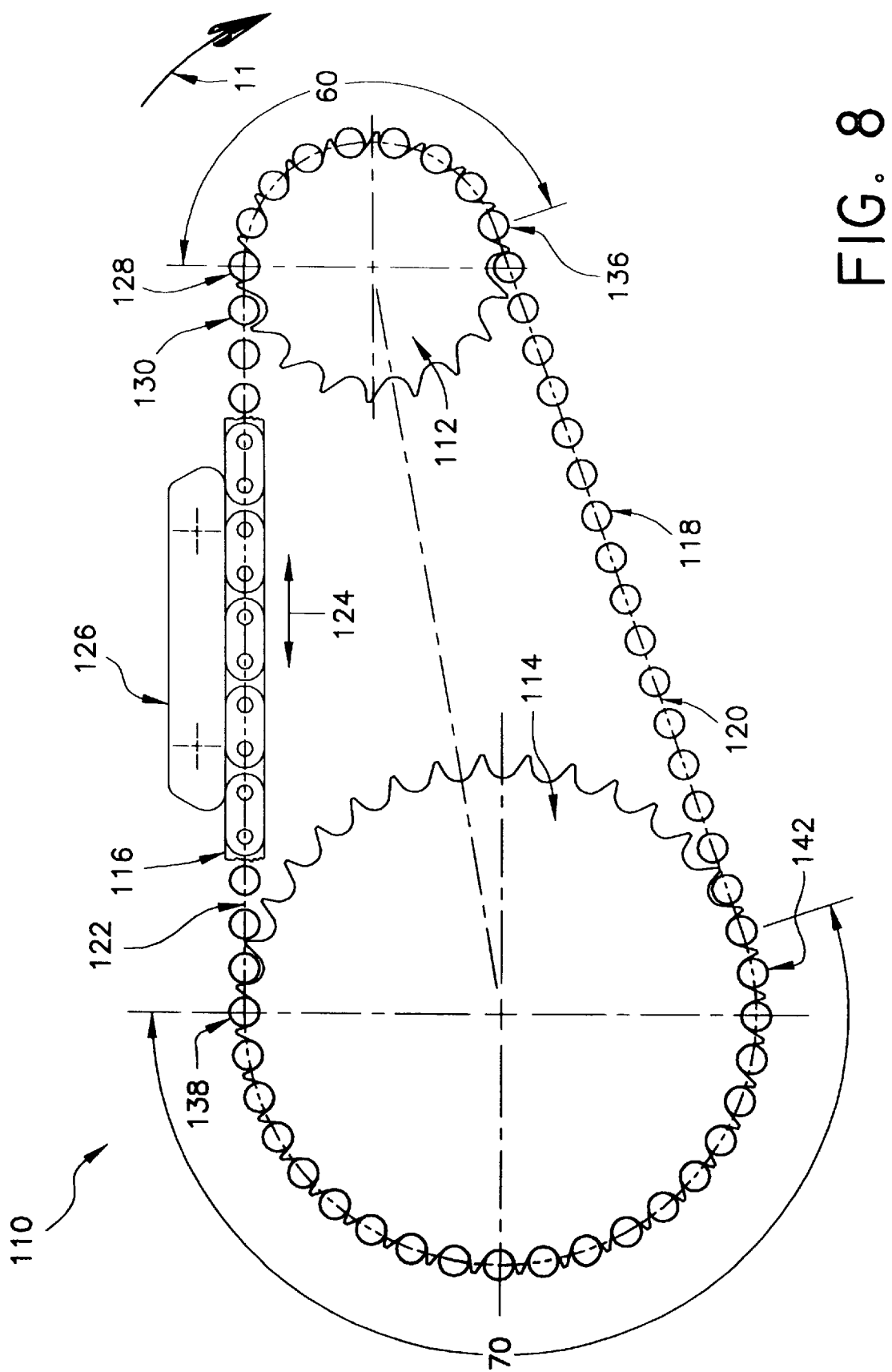
FIG. 8 illustrates a roller chain drive system having a roller chain drive sprocket and driven sprocket which incorporate the features of the present invention therein.

With reference now to FIG. 8, a roller chain drive system 110 includes a drive sprocket 112 and a driven sprocket 114 which incorporate the features of the present invention therein. The roller chain drive system 110 further includes a roller chain 116 having a number of rollers 118 which engage and wrap about sprockets 112, 114. The roller chain rotates in a clockwise direction as shown by arrow 11.

The roller chain 116 has two spans extending between the sprockets, slack strand 120 and taut strand 122. The roller chain 116 is under tension as shown by arrows 124. A central portion of the taut strand 122 may be guided from the driven sprocket 114 to the drive sprocket 112 with a chain guide 126. A first roller 128 is shown fully seated at a 12 o'clock position on the drive sprocket 112. A second roller 130 is adjacent to the first roller 128 and is about to mesh with the drive sprocket 112.

To facilitate the description of an asymmetrical tooth profile of the present invention, reference will be made only to the drive sprocket 112. However, the asymmetrical tooth profile of the present invention is equally applicable to the driven sprocket 114, as well as to idler sprockets and sprockets associated with counter rotating balance shafts.

Figure 9:
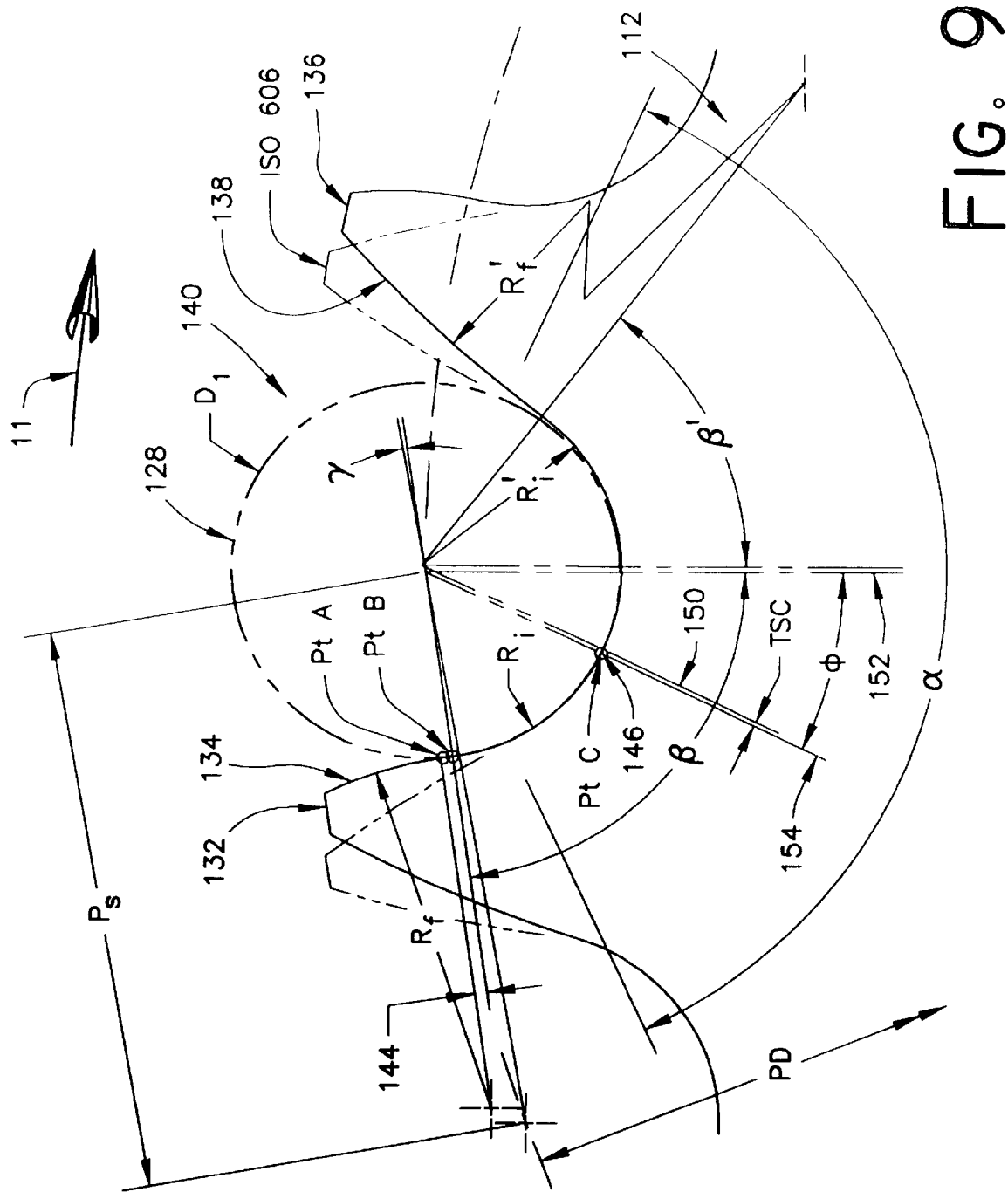
FIG. 9 illustrates the roller chain drive sprocket of FIG. 8 with an asymmetrical tooth space form in accordance with a first embodiment of the present invention.
Figure 10:
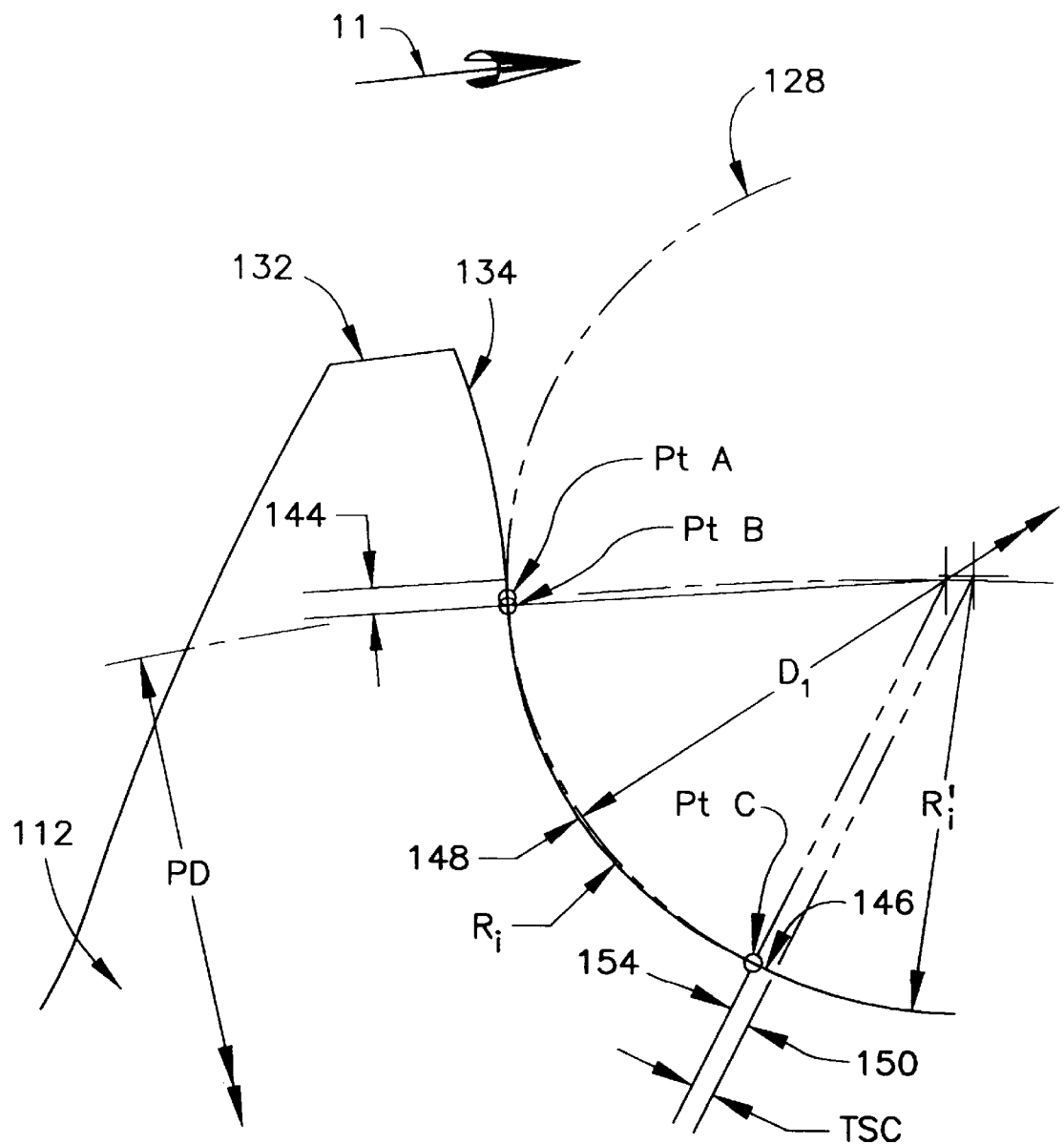
FIG. 10 is an enlarged view of the asymmetrical tooth space form of FIG. 9 showing a roller in two-point contact with the sprocket.

Referring now to FIGS. 9 and 10, the sprocket 112 includes a first tooth 132 having an engaging flank 134, and a second tooth 136 having a coast or disengaging flank 138. The engaging flank 134 and coast flank 138 cooperate to define a tooth space 140 which receives the engaging roller 128 (shown in phantom). The engaging roller 128 has a roller diameter $D_1$, and is shown fully seated in two-point contact within the tooth space 140 as described further below. More particularly, the engaging roller 128, when fully seated in the tooth space, contacts two lines or ridges B and C that extend axially along each sprocket tooth surface (i.e., in a direction orthogonal to the plane of the drawings). However, to facilitate a description thereof, the lines or ridges A, B, and C are hereafter shown and referred to as contact points within the tooth space.

The engaging flank 134 has a radius $R_f$ which is tangent to a radially outer end of a flank flat 144. The location of the flank flat 144 is defined by an angle $\beta$, with the flat orientation being normal or perpendicular to a line that passes through Point B and the center of roller 128 when the roller is contacting the sprocket at Points B and C. The length of the flank flat extending radially outward from Point B affects a time delay between an initial tangential impact between sprocket 112 and roller 128 at a first contact Point A along the flank flat 144, and a subsequent radial impact at Point C. It is believed that the roller stays in contact with the flank flat from its initial tangential contact at Point A until the roller moves to a fully engaged two-point contact position at Points B and C. The pressure angle $\gamma$, the amount of pitch mismatch between the chain and the sprocket, and the length of the flank flat can be varied to achieve a desired initial roller contact Point A at the onset of roller-sprocket meshing.

It should be appreciated that flank (tangential) contact always occurs first, with radial contact then occurring always at Point C regardless of chain pitch length. In contrast, with known tooth space forms (e.g., ISO compliant and asymmetrical) incorporating single point contact (e.g. single line contact), an engaging roller must move to a driving position after making radial contact. The pressure angles $\gamma$ therefore assume that the engaging roller will contact at the flank radius/root radius tangency point. Thus, the meshing contact location of the known single point/line tooth space forms is pitch "sensitive" to determine where the radial impact as well as tangential impact will occur.

The engaging flank roller seating angle $\beta$ (FIG. 9) and a disengaging flank roller seating angle $\beta'$ replace the ISO-606 roller seating angle a (ISO profile shown in phantom). The pressure angle γ is a function of the engaging flank roller seating angle β. That is, as β increases, γ decreases. A minimum asymmetrical pressure angle can be determined from the following equation, where:

$$\gamma_{min} = \beta_{max} - (\alpha_{max}/2 + \gamma_{ISO\ min})$$

Therefore, an asymmetrical pressure angle $\gamma_{min}=0$ when $\beta_{max}=(\alpha_{max}/2+\gamma_{ISO\ min})$ as illustrated in FIG. 21. FIG. 21 lists the maximum Beta (β) angles and the corresponding minimum pressure angles (γ) for several sprocket sizes and several asymmetrical profiles. It should be appreciated that reducing the engaging flank pressure angle γ reduces the tangential impact force component $F_{IA}$ (FIG. 14) and thus the tangential impact noise contribution to the overall noise level at the onset of engagement.

Impact force $F_{IA}$ is a function of the impact velocity which in turn is related to pressure angle γ. As pressure angle γ is reduced, it provides a corresponding reduction in the impact velocity between the chain and the sprocket at the onset of meshing. A minimum pressure angle γ also facilitates a greater separation or distance between tangential contact points A and B to further increase or maximize engagement "staging". In the preferred embodiment, the engaging flank pressure angle γ is in the range of about −2.0° to about +5° to optimize the staged impact between the roller and the sprocket.

Figure 1:
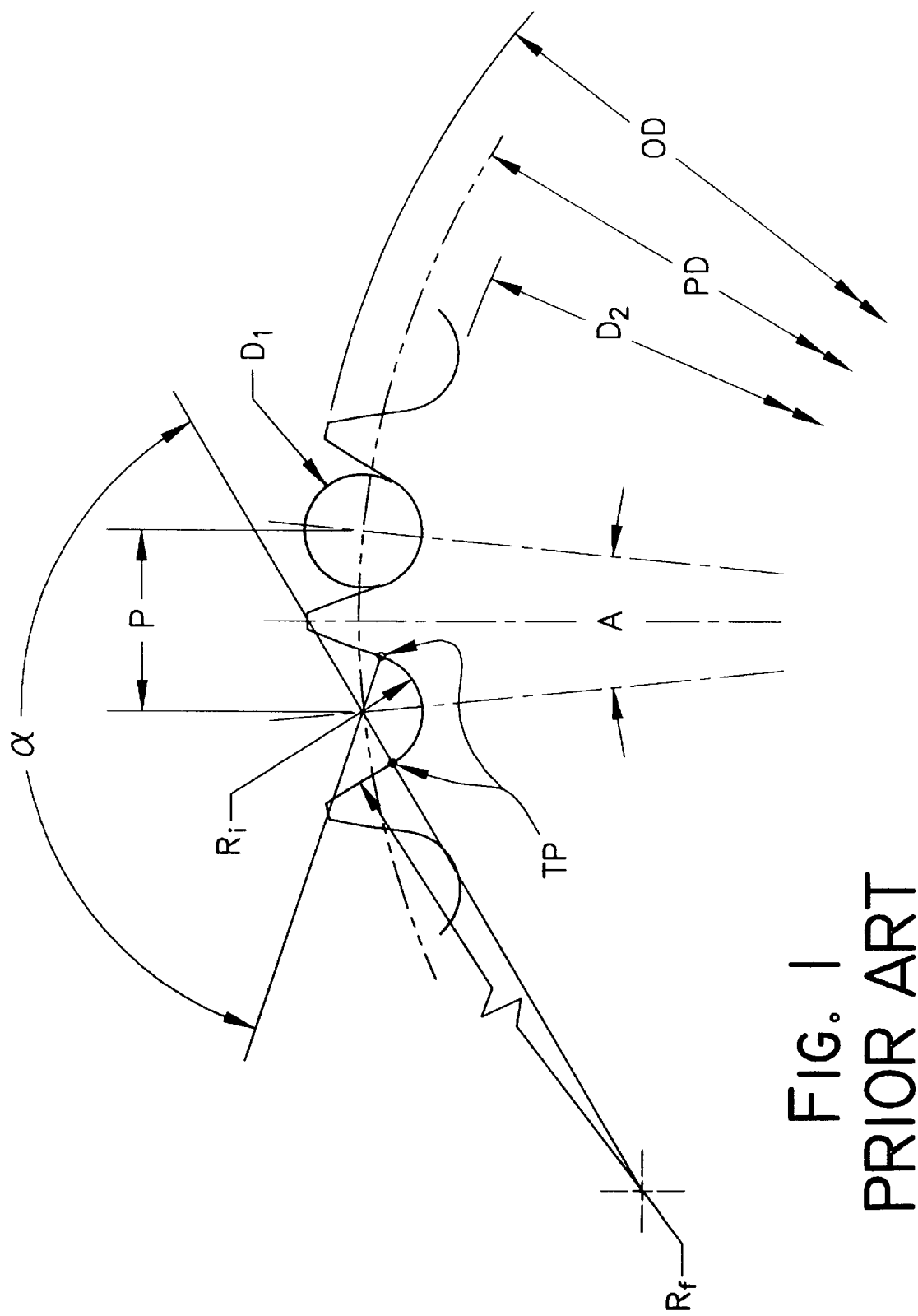
FIG. 1 illustrates a symmetrical tooth space form for a ISO-606 compliant roller chain sprocket.
Figure 2:
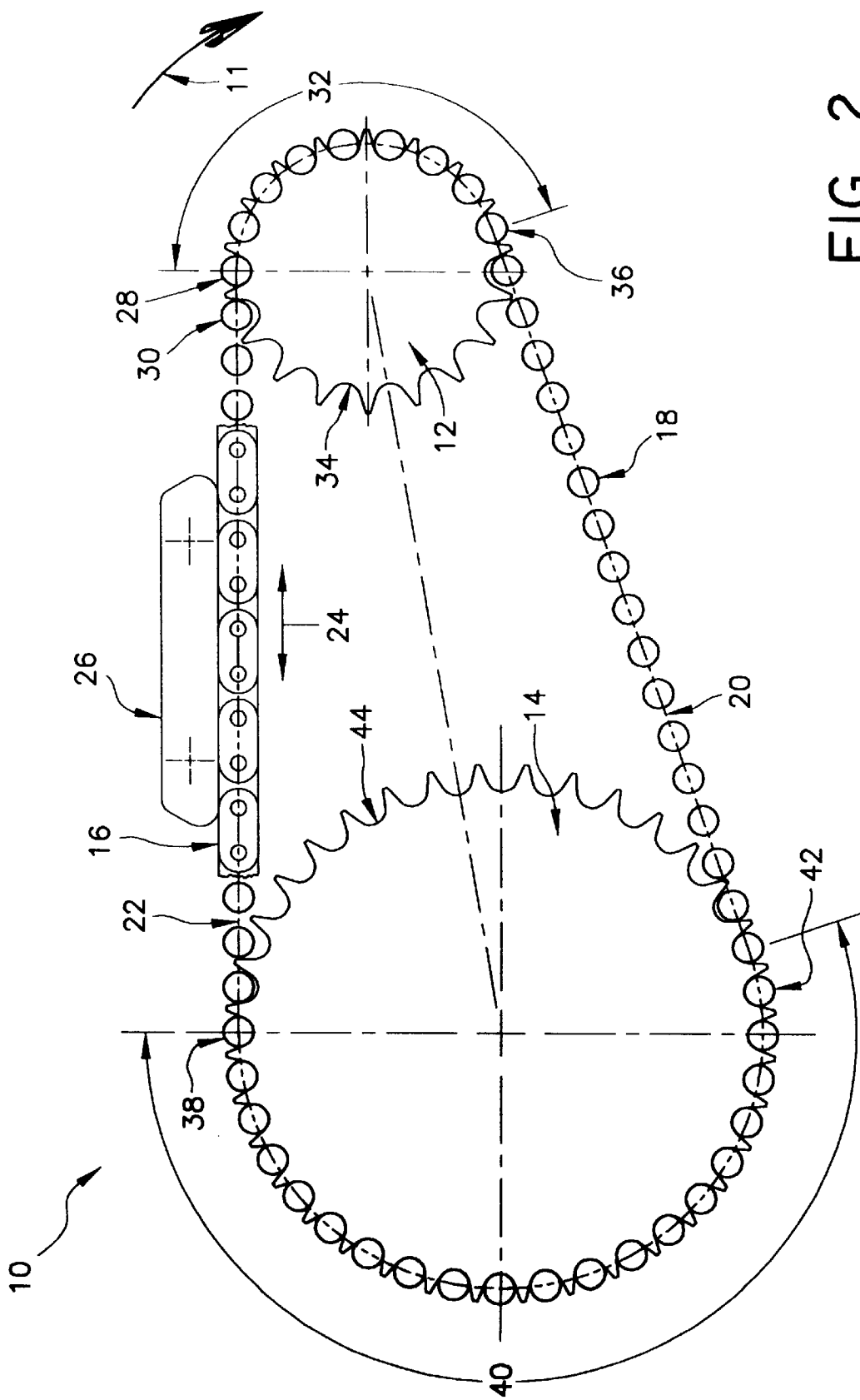
FIG. 2 is an exemplary roller chain drive system having a ISO-606 compliant drive sprocket, driven sprocket, and roller chain.
Figure 3:
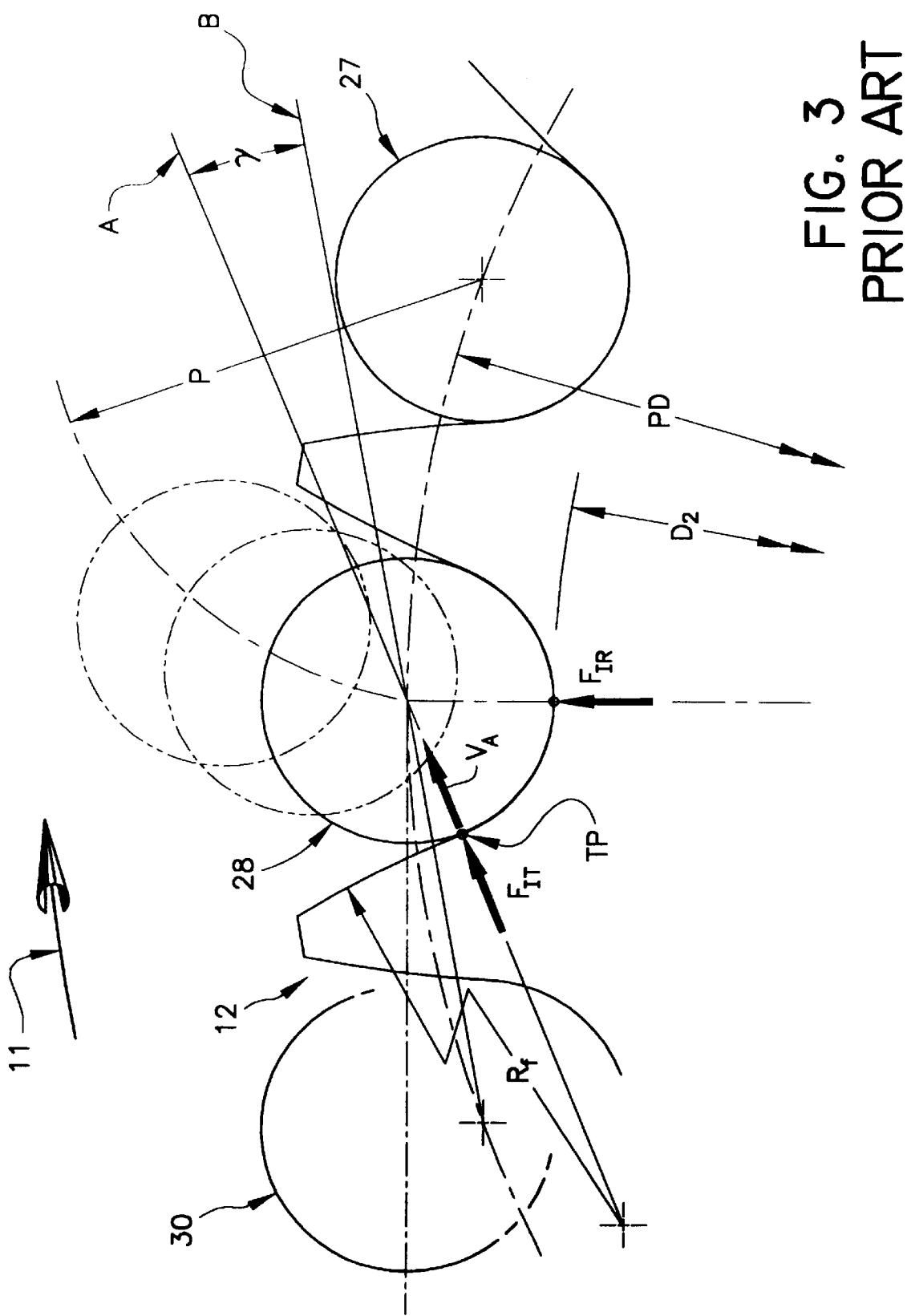
FIG. 3 shows an engagement path (phantom) and a roller (solid) in a driving position as a ISO-606 compliant drive sprocket rotates in a clockwise direction.
Figures 4A, 4B:
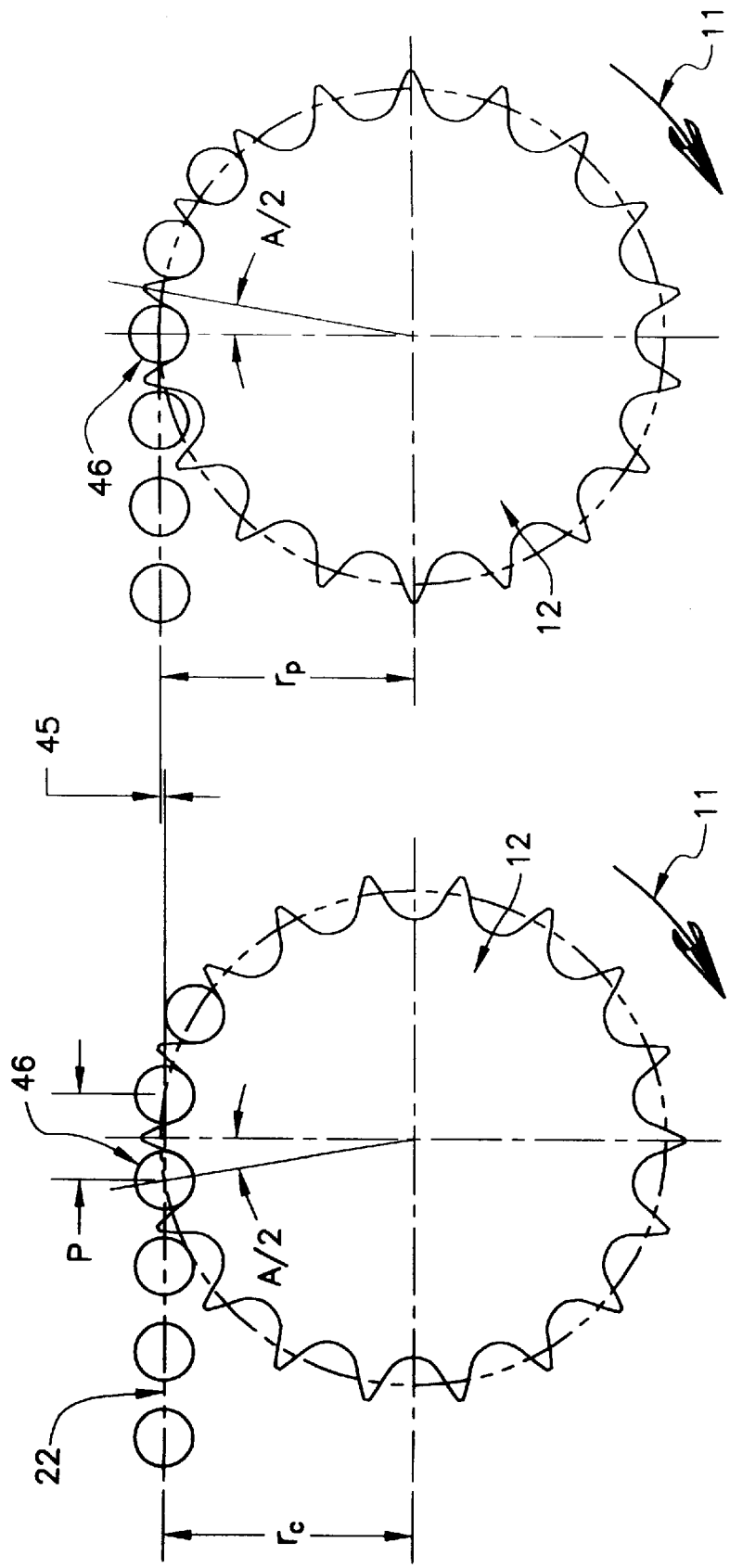
FIG. 4a shows a roller at the onset of meshing with an exemplary 18-tooth sprocket.
FIG. 4b shows the drive sprocket of FIG. 4a rotated in a clockwise direction until the roller is at a 12 o'clock position.
Figure 5:
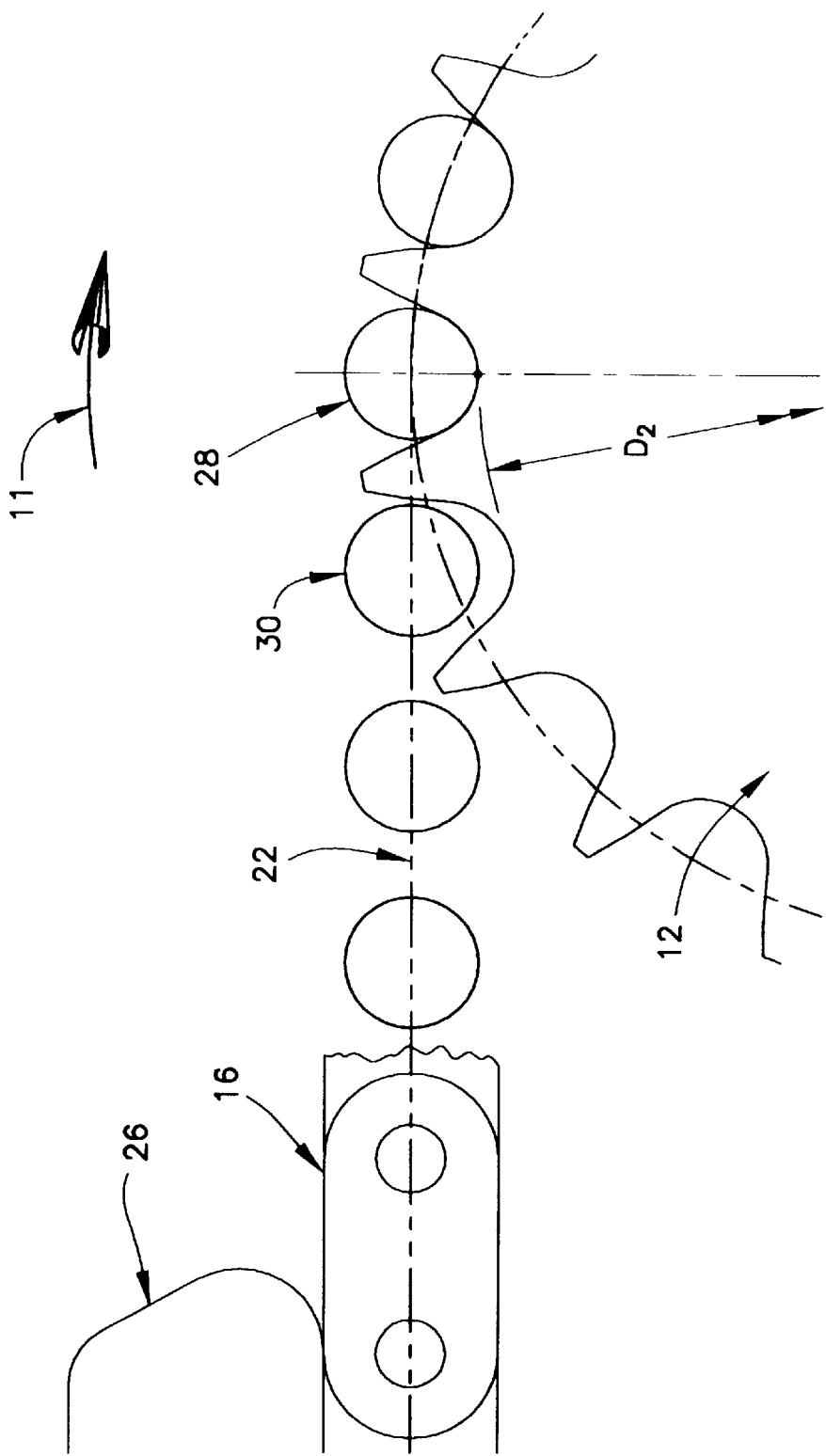
FIG. 5 is an enlarged view of the drive sprocket of FIG. 2 with a roller fully seated in a tooth space and a second roller about to mesh with the drive sprocket.
Figure 6:
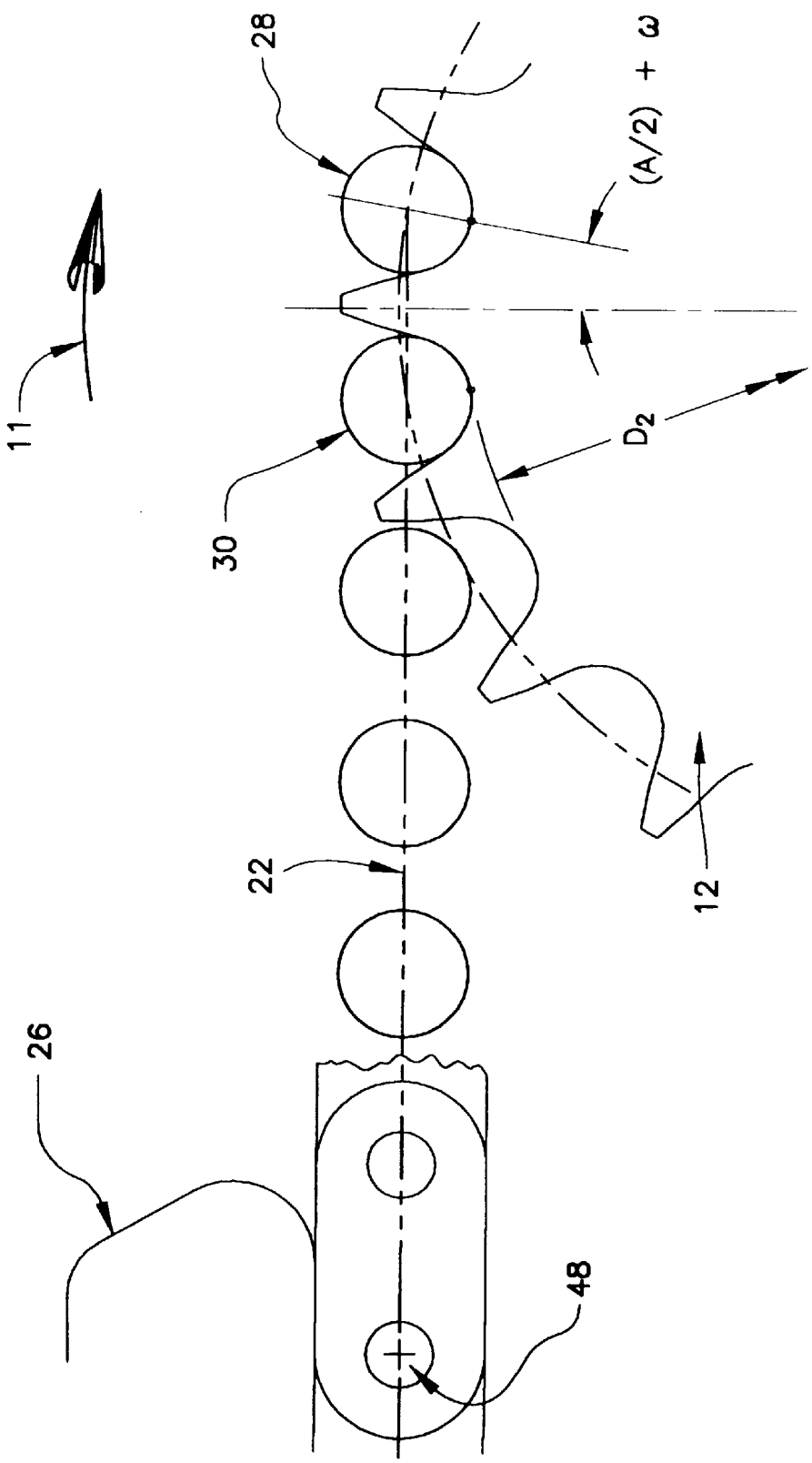
FIG. 6 shows the drive sprocket of FIG. 5 rotated in a clockwise direction until the second roller initially contacts the drive sprocket.
Figure 7:
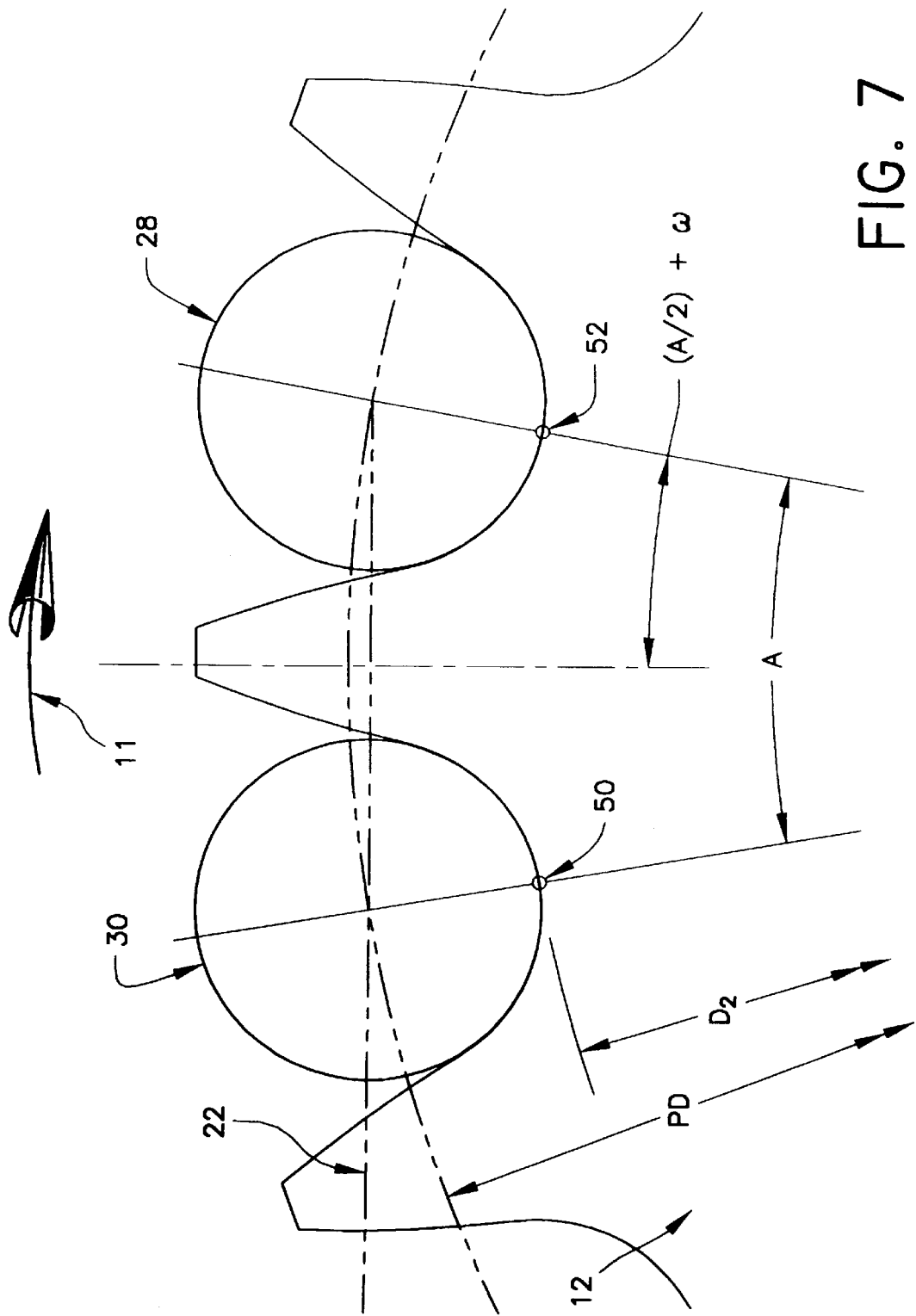
FIG. 7 is an enlarged view of FIG. 6 showing that the second roller initially contacts a root surface (i.e., radial impact) of the drive sprocket, under theoretical conditions.
Figure 11:
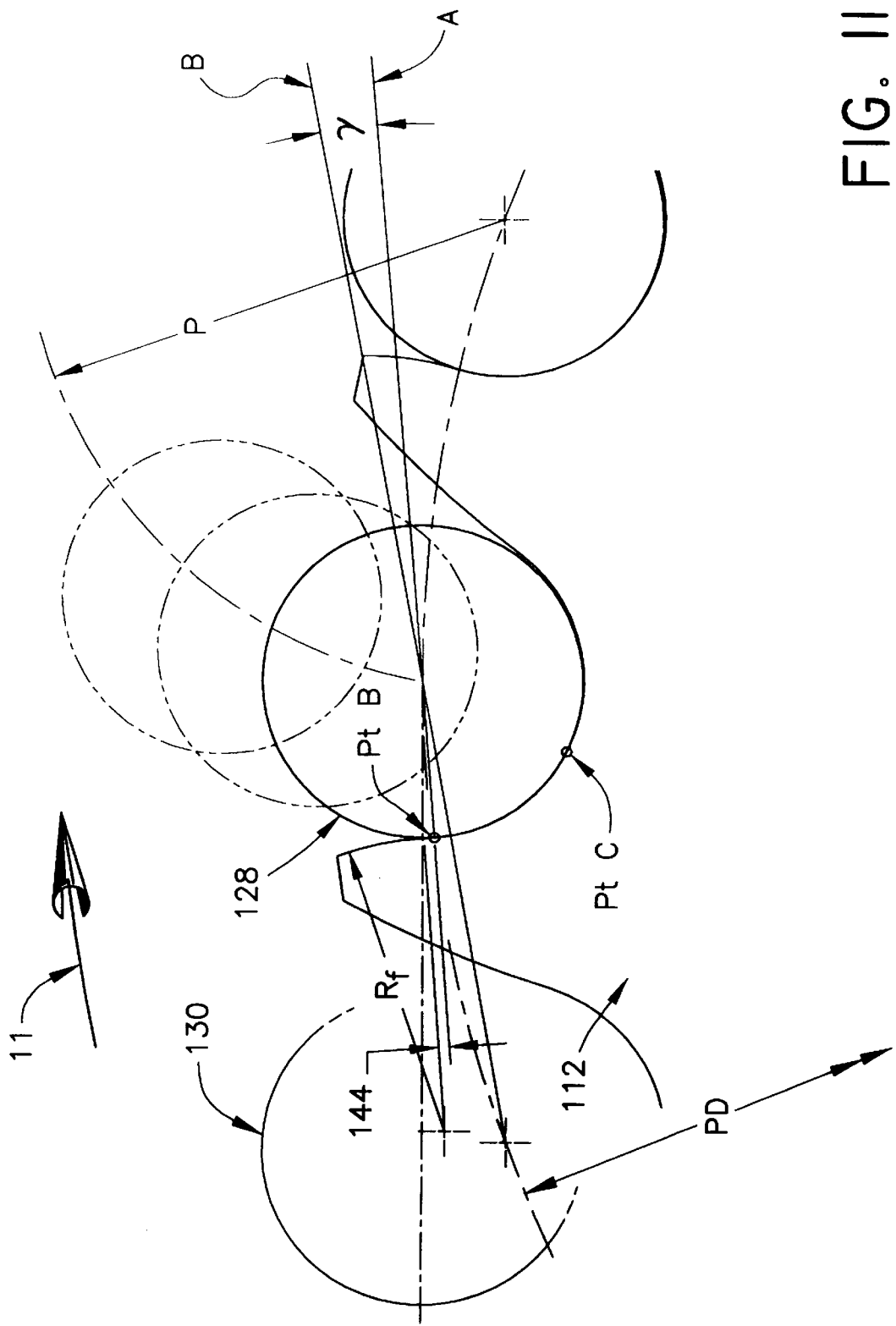
FIG. 11 shows an engagement path (phantom) and a roller (solid) at the instant of full mesh as the drive sprocket of FIG. 8 rotates in a clockwise direction.

In the embodiment being described, roller seating angle β is greater than ISO $\alpha_{max}/2$ at a maximum material condition and β can be adjusted until a desired engaging flank pressure angle γ is achieved. For instance, the roller seating angle β of FIG. 9 provides a pressure angle γ that is less than zero, or a negative value. The negative pressure angle γ is best seen in FIG. 11, as contrasted with the ISO-606 compliant tooth profile of FIG. 3 with a positive pressure angle γ. As shown in FIG. 11, the asymmetrical profile pressure angle γ is defined as the angle between a line A extending from the center of the fully engaged roller 128, when it is contacting the engaging tooth flank at points B and C, through point B, and a line B connecting the centers of the fully seated roller 128, and the center of the next meshing roller 130 as if it were also two-point seated at full mesh in its engaging tooth space.

It is believed that a small negative pressure angle for the theoretical chain/sprocket interface beneficially provides a pressure angle γ closer to zero (0) for a "nominal" system or for a system with wear. However, the engaging flank roller seating angle β may be beneficially adjusted so as to provide any engaging flank pressure angle γ having a value less than the minimum ISO-606 pressure angle.

Referring again to FIGS. 9 and 10, a first root radius $R_i$ is tangent to a radially inner end of the flank flat 144, and tangent to a radially outer end of an inclined root surface 146. As best seen in FIG. 10, a maximum root radius $R_i$ must be equal to, or less than, a minimum roller radius $0.5D_1$ to facilitate the fully engaged two-point/line contact at Points B and C. Accordingly, this will define a small clearance 148 (FIG. 10) between the engaging flank 134 at root radius $R_i$ and roller 128 at full mesh (i.e., two-point/line contact). The flank flat 144 and the inclined root surface 146 necessarily extend inside Points B and C respectively to facilitate the two-point/line roller contact at full engagement for all dimensional tolerance conditions of the roller 128 outside diameter ($D_1$) and the root radius $R_i$. A second root radius $R_i'$ is tangent to a radially inner end of the inclined root surface 146 at line 150. The coast flank has a radius $R_i'$ at a point defined by the roller seating angle β'.

The inclined root surface 146 is a flat surface having a finite length which defines a tooth space clearance (TSC). The tooth space clearance compensates for chain pitch elongation or chain wear by accommodating a specified degree of chain pitch elongation ΔP. In other words, the tooth space clearance TSC enables rollers of a worn chain to be maintained in hard contact with the inclined root surface of the sprocket teeth. In addition, the inclined root surface 146 facilitates reducing the radial reaction force thereby reducing the roller radial impact noise contribution to the overall noise level.

The inclined root surface 146 may be inclined at any angle φ necessary to satisfy a specific geometry elongation. As shown in FIG. 9, the inclined root surface angle φ is measured from a line 152 passing through the center of roller 128 and the sprocket center to a second line 154 which also passes through the center of roller 128 and Point C. The inclined root surface 146 is normal to the line 154, and the inclined root surface extends radially inward to line 150 where it is tangent to $R_i'$. In the embodiment being described, the inclined root surface angle φ is preferably in the range of about 20° to about 35°.

Figure 12:
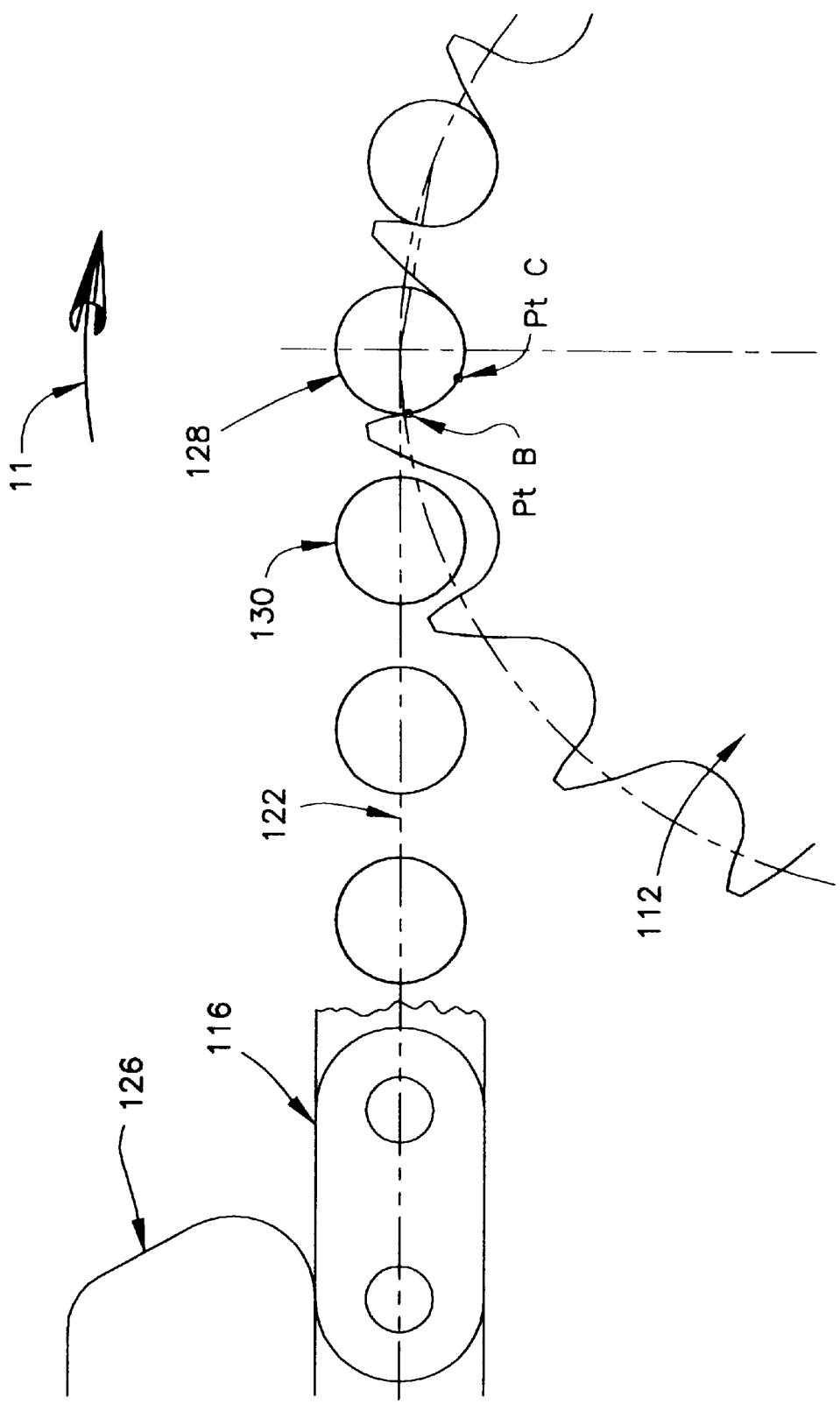
FIG. 12 is an enlarged view of the drive sprocket of FIG. 8 with a roller fully seated in a tooth space and a second roller being collected from a taut span of the roller chain.

FIG. 12 is an enlarged view of FIG. 8 showing the first roller 128 at full engagement in two-point/line contact across the thickness or width of the sprocket tooth profile, and the second roller 130 as the next roller about to mesh with sprocket 112. As with the ISO compliant drive system 10, the chain guide 126 controls and guides a central portion the taut strand 122 except for five unsupported link pitches extending between the chain guide 126 and the engaging roller 128 (and except for the unsupported link pitches extending between the driven sprocket and the chain guide). The taut strand 122 is horizontal when roller 128 is at the 12 o'clock position.

Figure 13:
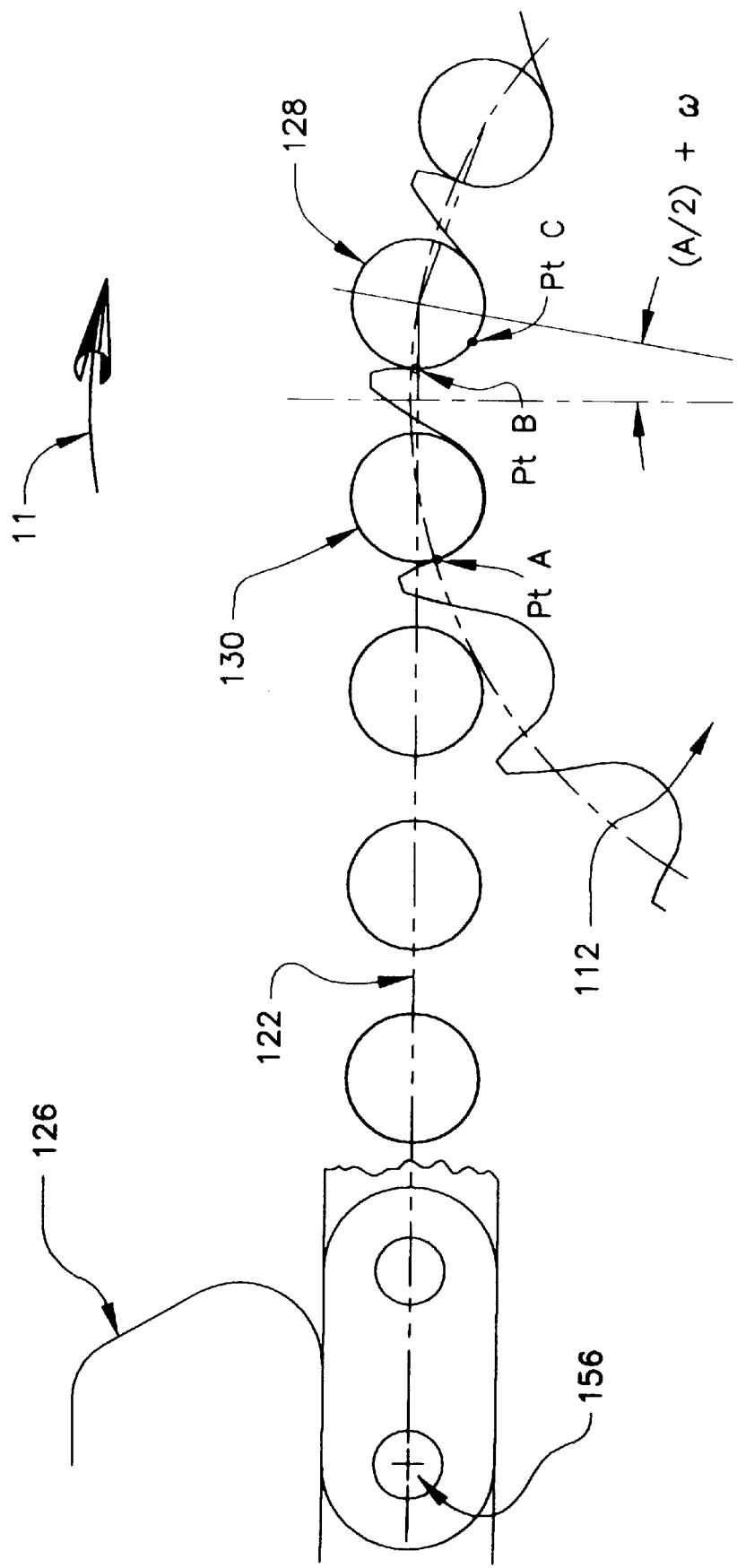
FIG. 13 shows the drive sprocket of FIG. 12 rotated in a clockwise direction until the second roller initially contacts the drive sprocket.

FIG. 13 shows the drive sprocket 112 rotated in a clockwise direction (A/2)+ω, as determined by the instant of sprocket engagement by roller 130. A straight line is assumed for the chain span from roller 128 to a chain pin center 156, about which the unsupported span from pin center 156 to engaging roller 130 is considered to rotate. It should be appreciated that the straight line assumption is valid only in a quasi-static model. The amount of movement (or deviation from the straight line assumption) previously mentioned will be a function of the drive dynamics as well as the drive and sprocket geometry.

The sprocket contact at the onset of mesh for roller 130 occurs earlier than for the ISO counterpart, thereby reducing the amount of chordal rise and, just as importantly, allows the initial contact to beneficially occur at a desired pressure angle γ on the engaging flank at Point A. Furthermore, the radial sprocket contact for roller 130, with its contribution to the overall noise level, does not occur until the sprocket rotation places roller 130 at the 12 o'clock position. This is referred to as staged engagement.

Figure 14:
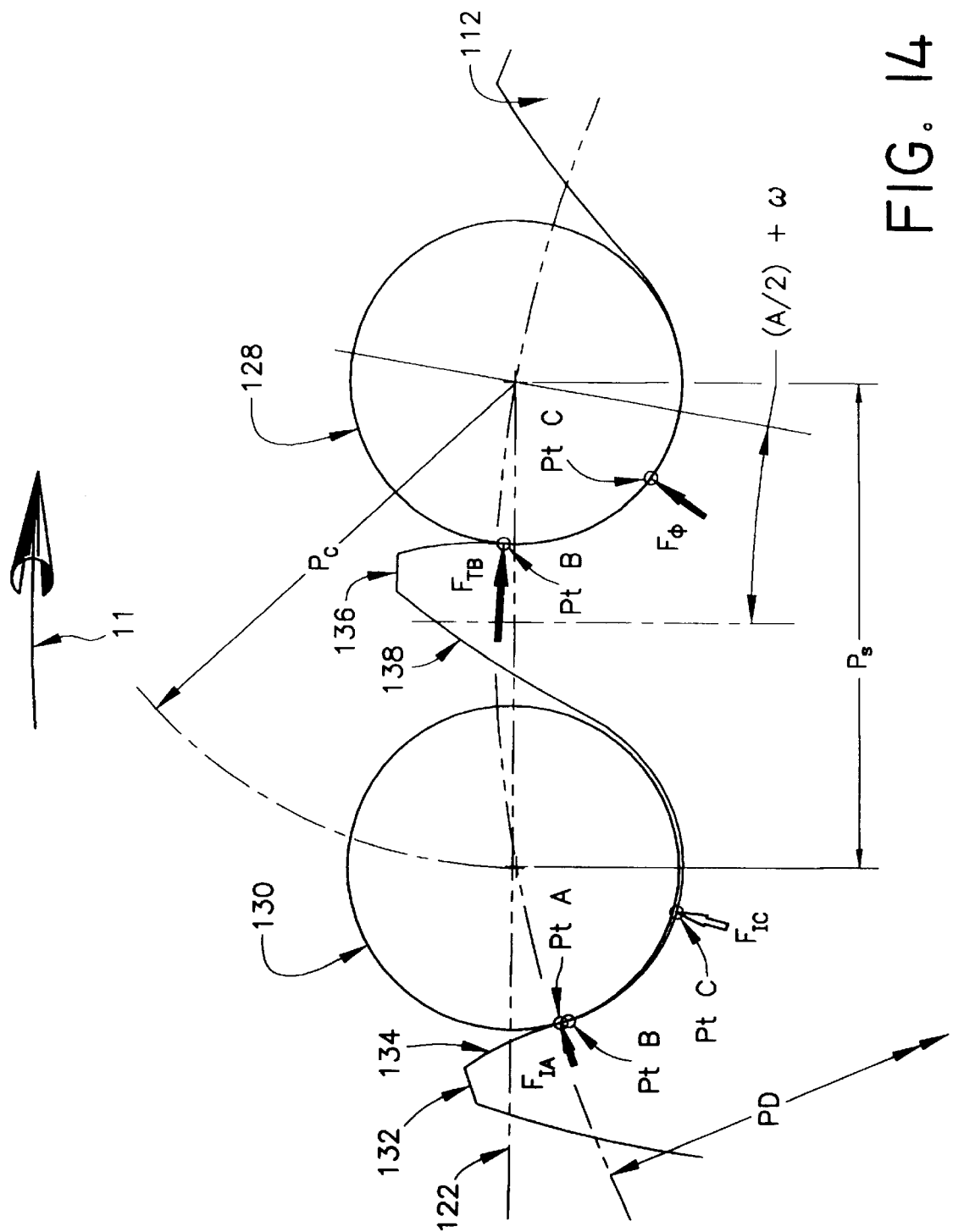
FIG. 14 is an enlarged view of FIG. 13 showing the first roller in two-point contact and second roller at initial tangential contact with the drive sprocket.

FIG. 14, an enlarged view of FIG. 13, more clearly shows the onset of meshing for roller 130. Just prior to the onset of mesh, roller 128 is assumed to carry the entire taut strand load $F_{TB}+F_\phi$, which load is shown as force vector arrows. Actually, the arrows represent reaction forces to the taut strand chain force. At the instant of mesh for roller 130, a tangential impact occurs as shown by impact force vector $F_{IA}$. The tangential impact is not the same as the taut strand chain loading. In particular, impact loading or impact force is related to the impact velocity $V_A$. It is known that impact occurs during a collision between two bodies, resulting in relatively large forces over a comparatively short interval of time.

Figure 14A:
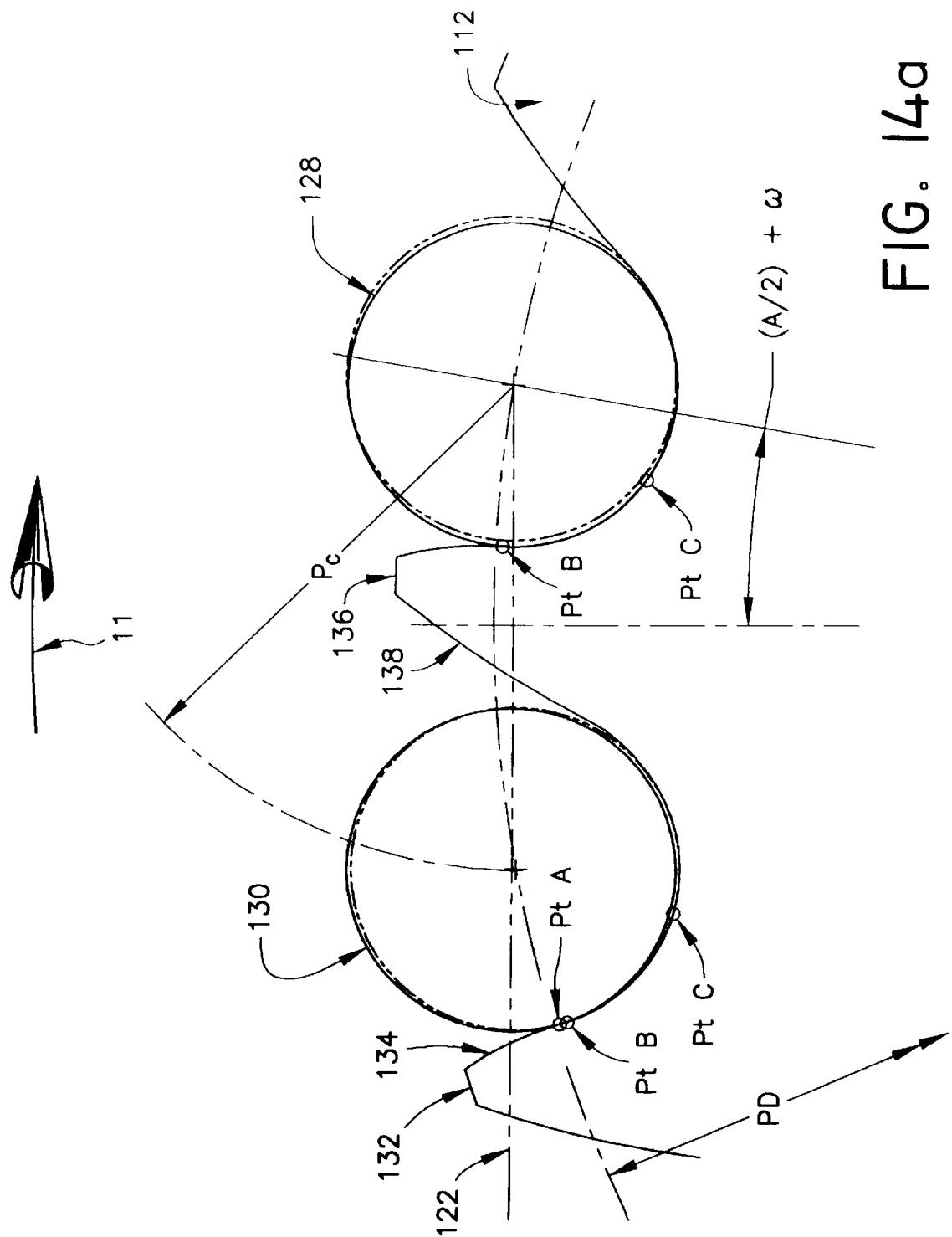
FIG. 14a illustrates the progression of a first and a second roller as the roller chain drive sprocket of FIG. 8 is rotated in a clockwise direction.

FIG. 14a shows the same roller positions (solid) for rollers 128 and 130 as shown in FIG. 14, but in addition, shows the roller positions (in phantom) relative to the sprocket profile once roller 130 reaches its two-point/line mesh at the 12 o'clock position. As a result of the pitch mismatch between the chain and sprocket, roller 128 must move to a new position. In particular, as roller 130 moves from initial contact to full mesh, roller 128 progresses forward in its tooth space. Small clearances in the chain joints, however, reduce the amount of forward progression required for roller 128. Also occurring at the onset of meshing is the beginning of the taut strand load transfer from roller 128 to roller 130.

The asymmetrical profile provides for the previously described "staged" meshing. In particular, referring again to FIG. 14, the Point A tangential contact occurs at the onset of mesh, with its related impact force $F_{IA}$. The roller 130 is believed to stay in hard contact with the engaging flank 134 as the sprocket rotation moves the roller into full mesh with its resulting radial contact at Point C. The radial impact force $F_{IC}$ (force vector shown as an outline) does not occur until the sprocket has rotated sufficiently to bring roller 130 into radial contact at Point C.

Figure 14B:
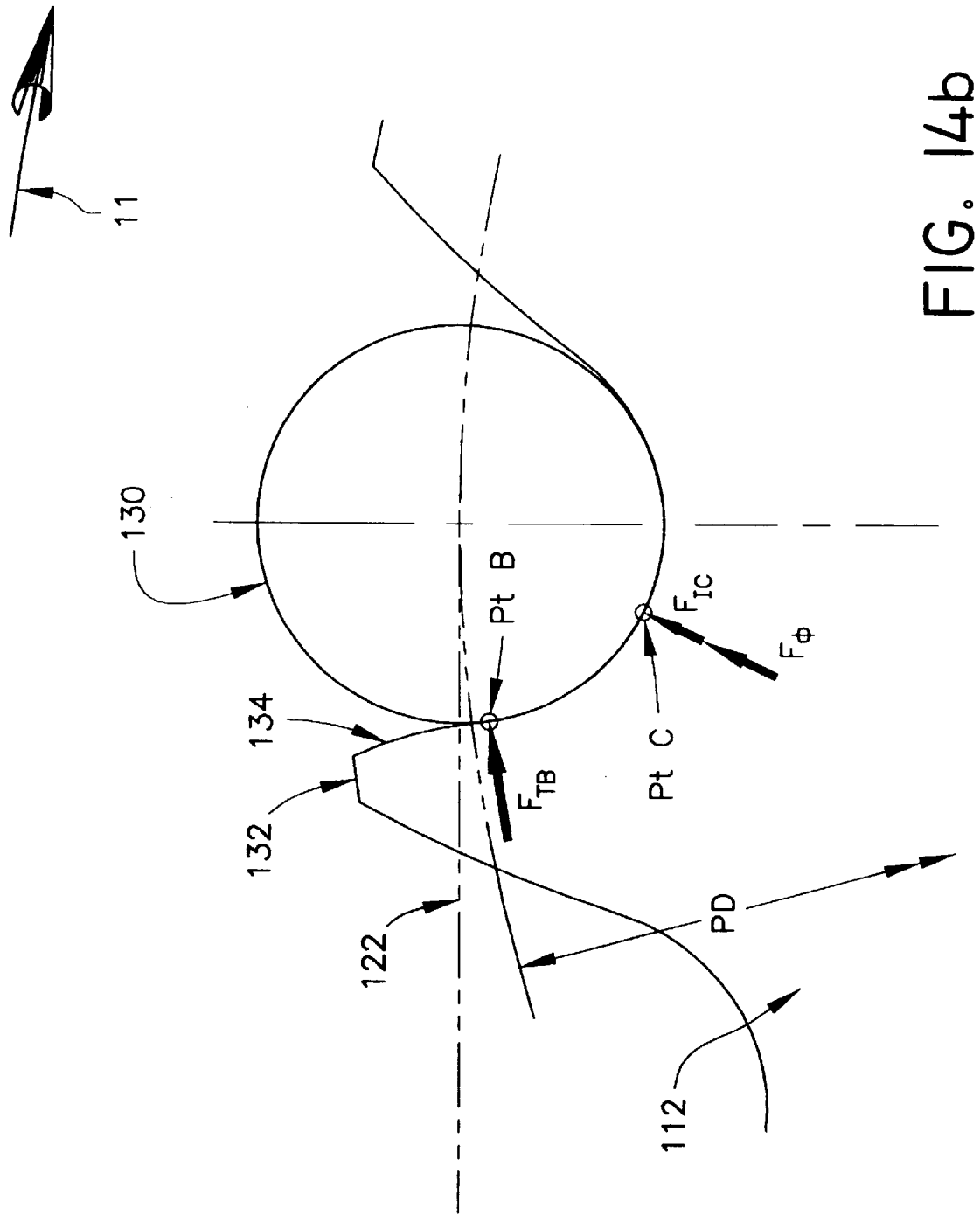
FIG. 14b is an enlarged view of the drive sprocket of FIG. 14 rotated in a clockwise direction to advance the second roller to the instant of full mesh at a 12 o'clock position.

FIG. 14b is an enlarged view of FIG. 14, except that sprocket 112 has been rotated to advance roller 130 to the instant of full mesh at the 12 o'clock position. At this instant of full mesh, the radial impact force $F_{IC}$ occurs and the taut strand load transfer is considered to be complete. At the instant of the radial collision by roller 130 at Point C, with its resultant radial impact force $F_{IC}$, the tangential impact force of $F_{IA}$ has already occurred and is no longer a factor. The time delay ("staged" engagement) between the tangential and radial roller-sprocket collisions effectively spreads the roller sprocket meshing impact energy over a greater time interval, thereby reducing its contribution to the generated noise level at mesh frequency. Additionally, it is believed that the present asymmetrical sprocket tooth profile beneficially permits a more gradual taut strand load transfer from a fully engaged roller 128 to a meshing roller 130 as the meshing roller 130 moves from its Point A initial mesh to its full two-point mesh position.

Referring again to FIG. 14, the chordal rise (and fall) with the present asymmetrical profile is the perpendicular displacement of the center of roller 130 from the taut strand 122 path as it moves from its initial meshing contact Point A to the mesh position presently occupied by roller 128. It is believed that roller 130 will stay in hard contact with the engaging flank 134 as the roller moves from initial tangential contact to full mesh, and accordingly, the chordal rise is reduced as the distance between Points A and B is increased. As shown in FIG. 14, chain pitch $P_C$ is beneficially greater than sprocket 112 chordal pitch $P_S$.

Figure 15:
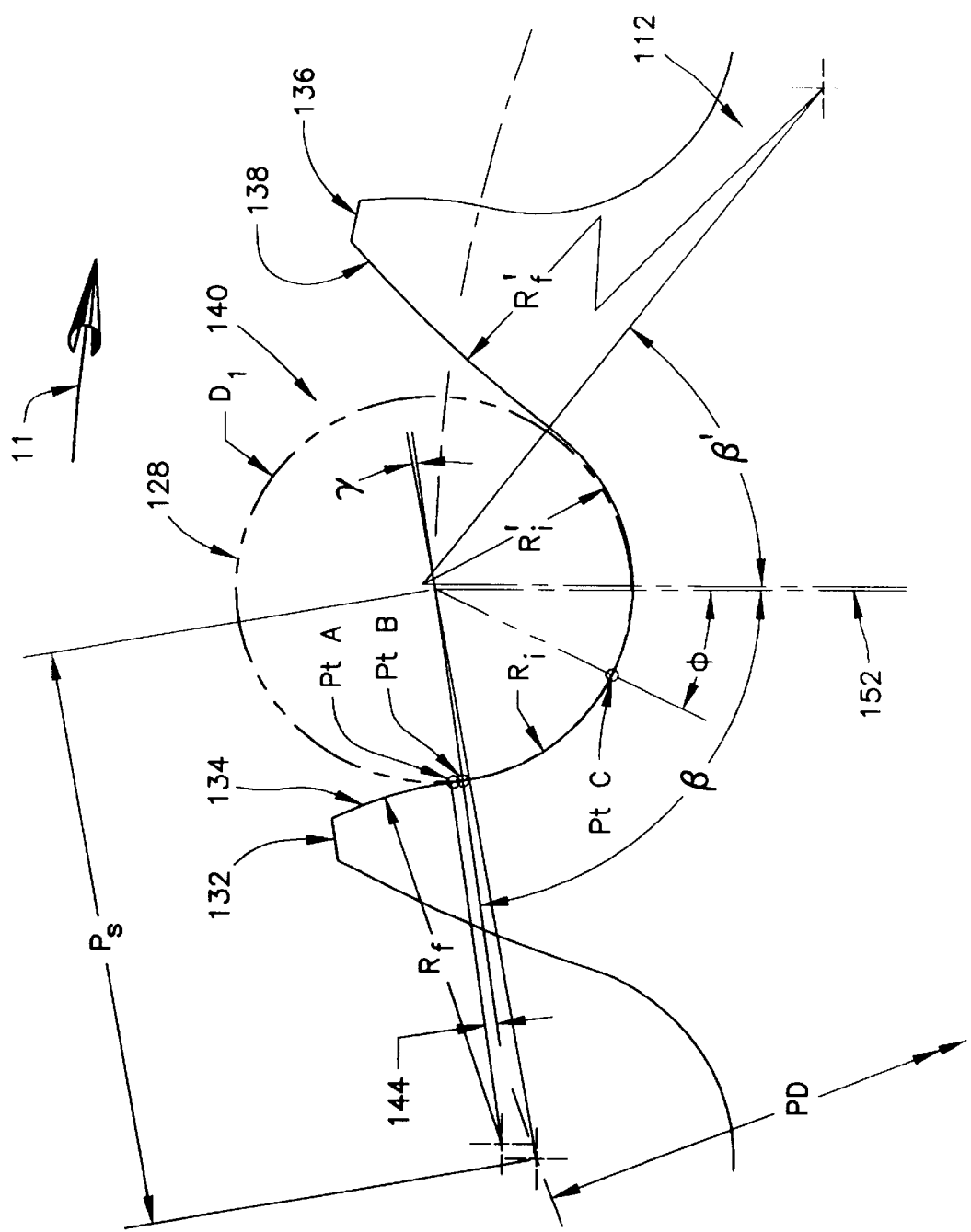
FIG. 15 illustrates a roller chain drive sprocket with an asymmetrical tooth space form in accordance with a second embodiment of the present invention.

Referring now to FIG. 15, the length of the inclined root surface 146 (FIG. 10) may be reduced to zero (0), thereby eliminating the portion of inclined roof surface 146 (between 154 and 150, thereby) permitting root radius $R_i'$ to be tangent to the root surface at Point C. That is, $R_i'$ is tangent to a short flat at Point C, and the flat is tangent to $R_i$. If the inclined root surface 146 is eliminated, the engaging flank pressure angle γ would generally be in the range of some positive value to zero, but normally not less than zero. The reason is that a negative γ requires chordal pitch reduction so that the roller can exit the sprocket wrap 158 (see FIG. 16) without interfering with $R_f$.

Figure 16:
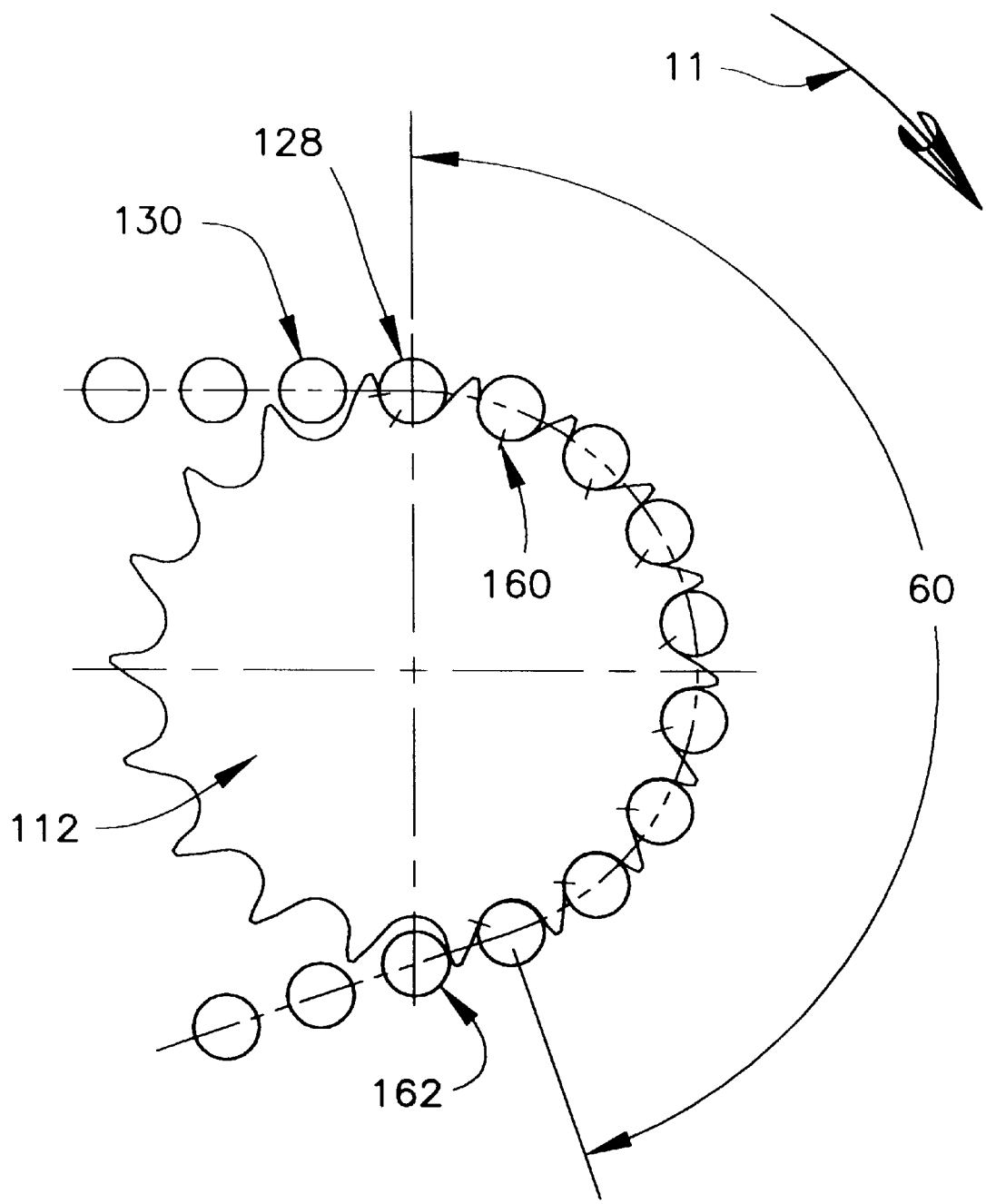
FIG. 16 is an enlarged view of FIG. 8, showing the contact progression as the rollers travel around the drive sprocket wrap.

FIG. 16 shows the roller contact to the sprocket 112 profile for all the rollers in the wrap 158. Roller 128 is in full two-point mesh as shown. Line 160 shows the contact point for each of the rollers, as well as the contact progression as the rollers travel around the wrap. The inherent pitch mismatch between the sprocket and roller chain causes the rollers to climb up the coast side flank as the rollers progress around the sprocket wrap. With the addition of appreciable chordal pitch reduction, the extent to which the rollers climb up the coast side flank in increased.

Figure 17:
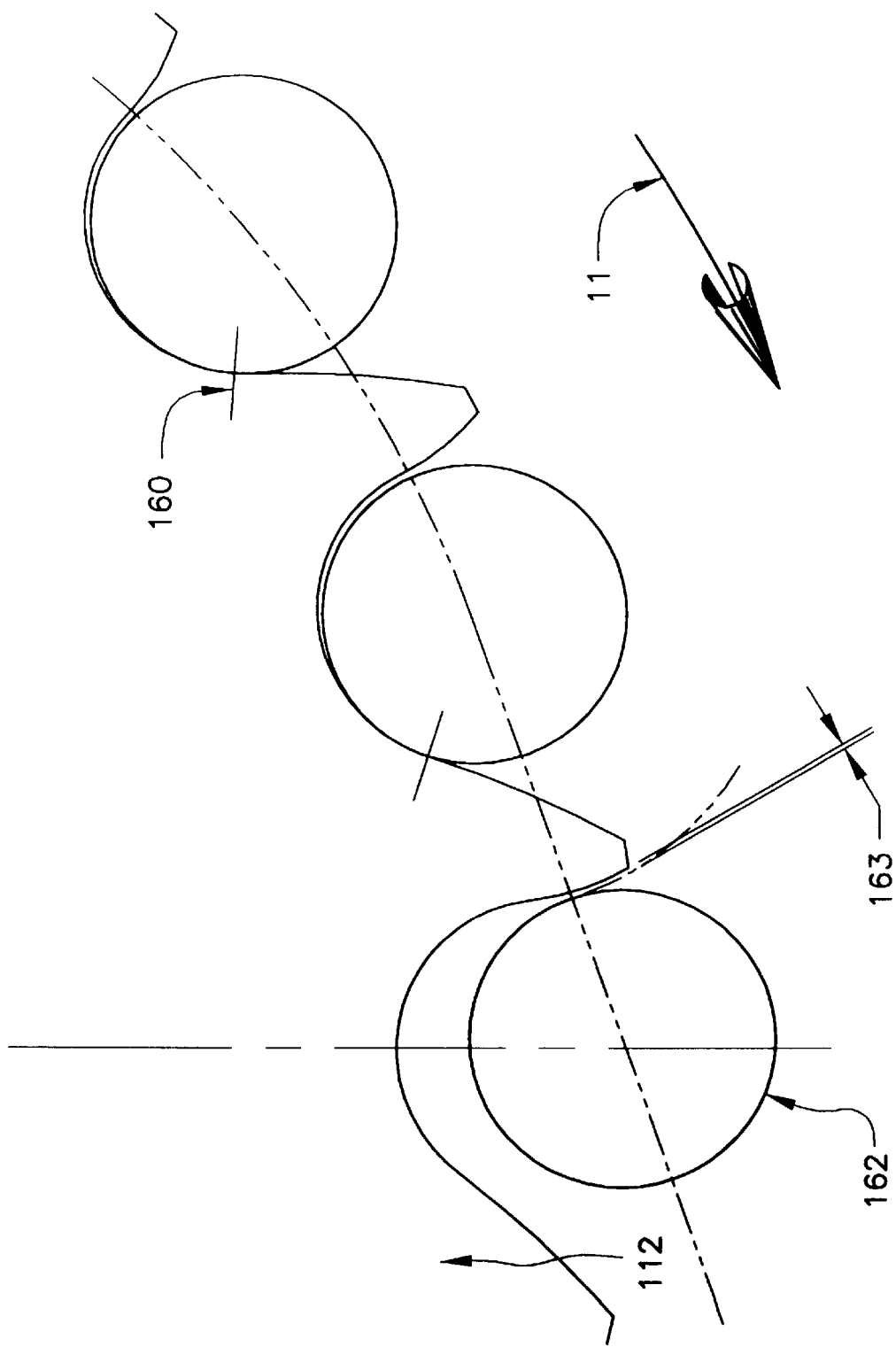
FIG. 17 is an enlarged view of a roller exiting a sprocket wrap of the sprocket of FIG. 8.

It is important to note that chordal pitch reduction is required when the pressure angle γ has a negative value. Otherwise, as shown in FIGS. 16 and 17, roller 162 would interfere with the engaging flank (with a maximum material sprocket and a theoretical pitch [shortest] chain) as it exits the wrap 158 back into the span. Also, the reduced chordal pitch assists the staged mesh as previously mentioned. FIG. 16, showing the roller contact progression in the wrap 158, serves also to show why the shallow β' angle and tooth space clearance TSC helps maintain "hard" roller-sprocket contact for the rollers in the wrap.

In addition, the disengaging flank roller seating angle β' (FIG. 9) may be adjusted to have a maximum value which is equal to $\alpha_{min}/2$ or even less. This reduced seating angle β' promotes faster separation when the roller leaves the sprocket and enters the span. This reduced angle β' also allows for the roller in a worn chain to ride up the coast flank surface to a less severe angle as the roller moves around the sprocket in the wrap.

The invention has been described with reference to the preferred embodiments. Obviously, modifications will occur to others upon a reading and understanding of this specification and this invention is intended to include same insofar as they come within the scope of the appended claims or the equivalents thereof.

It is contemplated that the above-described asymmetrical tooth profile features can be altered without substantially deviating from the chain and sprocket meshing kinematics that produce the noise reduction advantages of the present invention. For example, the engaging asymmetrical flank profile could be approximated by an involute form, and the disengaging asymmetrical flank profile could be approximated by a different involute form. Slight changes to the asymmetrical tooth profiles can be made for manufacturing and/or quality control reasons, or simply to improve part dimensioning. These changes are within the scope of the invention as disclosed herein.

Figure 18:
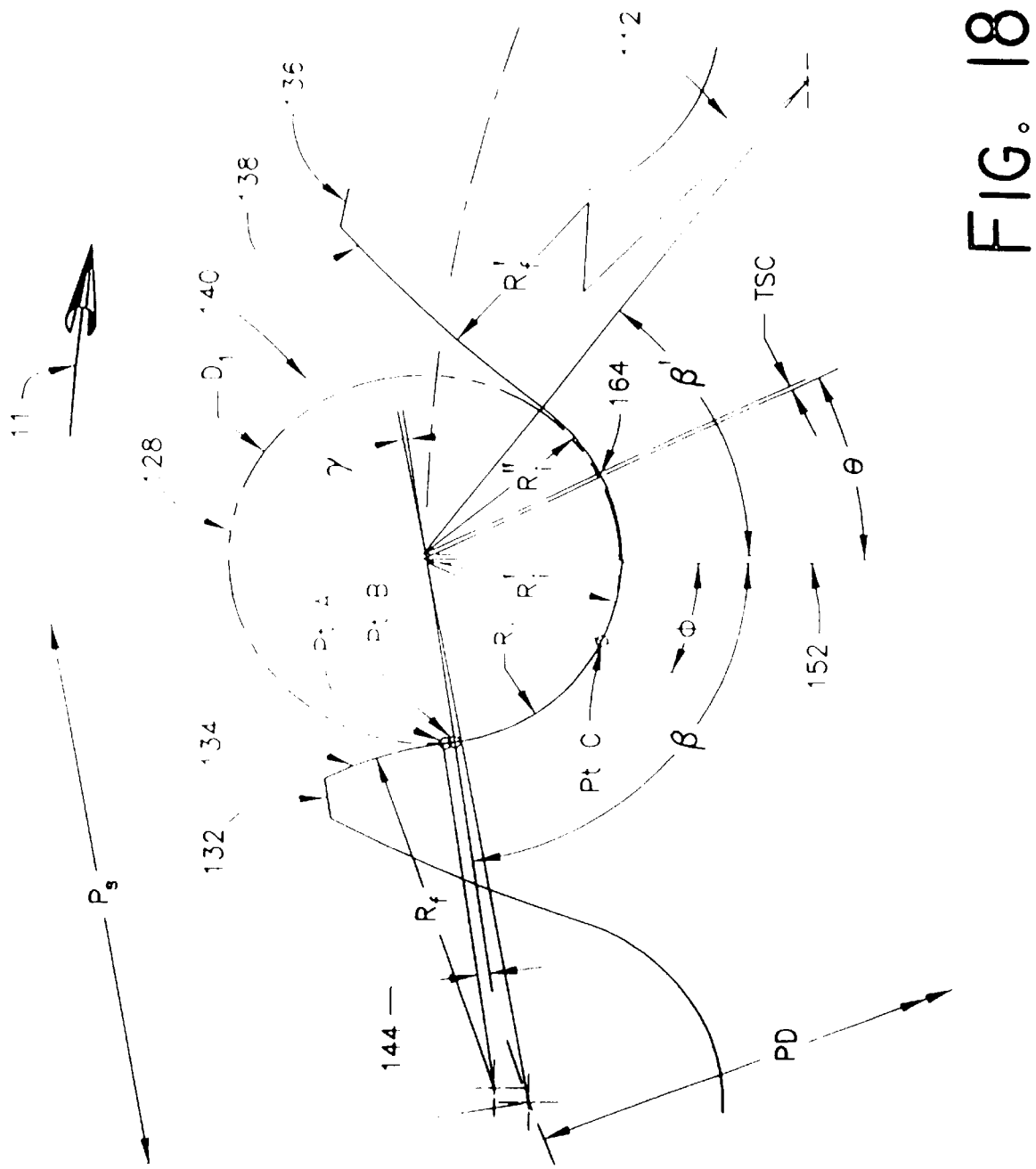
FIG. 18 illustrates a roller chain sprocket with an asymmetrical tooth space form in accordance with a third embodiment of the present invention.

In a further embodiment, the engaging flank inclined root surface 146 (FIG. 9) may be replaced with a coast flank inclined root surface 164 as shown in FIG. 18. The coast flank inclined root surface 164 provides tooth space clearance (TSC) in the same manner as described above with regard to the inclined root surface 146. In addition, the engaging flank inclined root surface 164 beneficially moves the roller to a preferred radially outward position as the chain wears.

Figure 19:
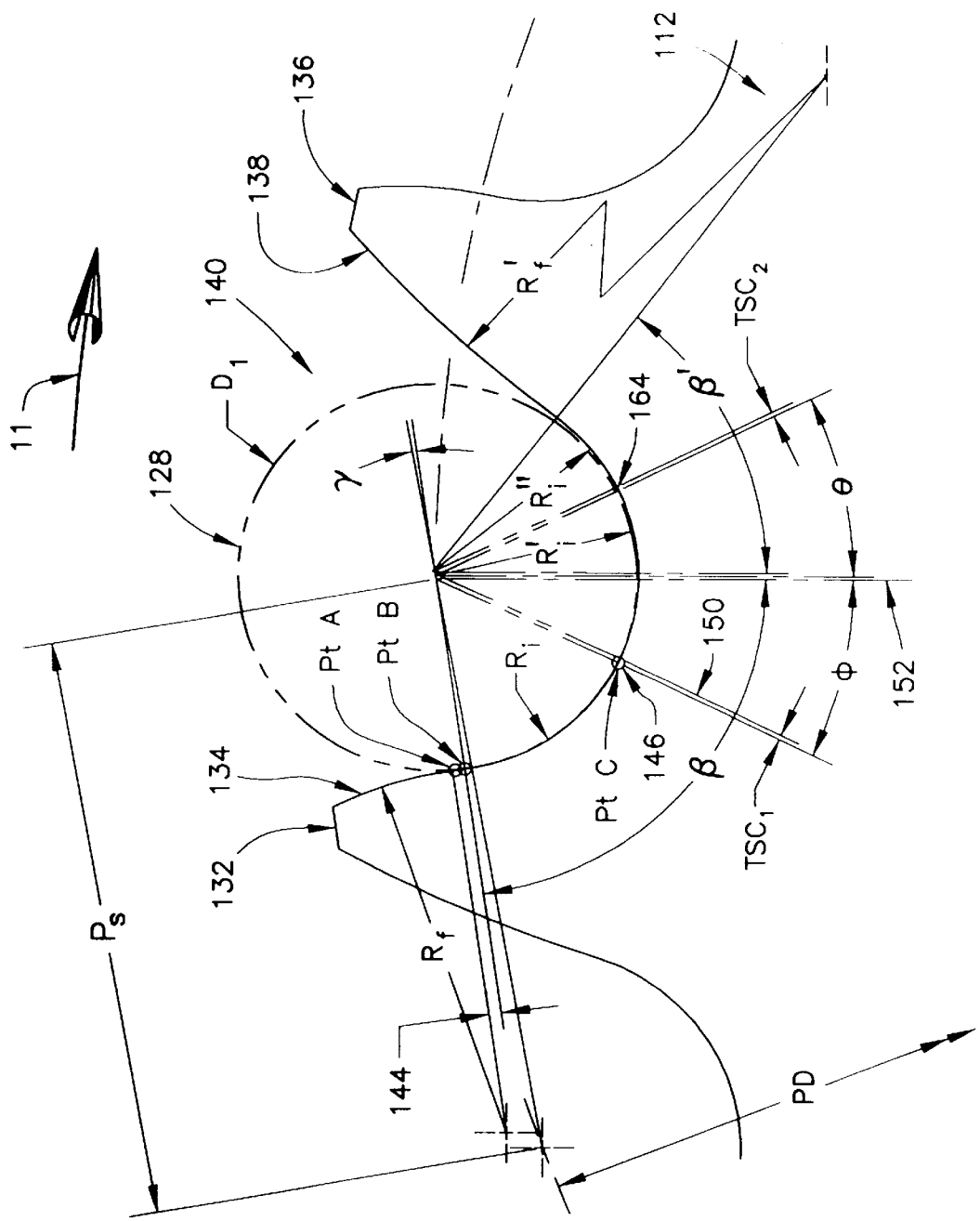
FIG. 19 illustrates a roller chain sprocket with an asymmetrical tooth space form in accordance with a fourth embodiment of the present invention.

Alternatively, the coast flank inclined root surface 164 may be included with the engaging flank inclined root surface 146 as shown in FIG. 19. The engaging flank and coast flank inclined root surfaces 146, 164 cooperate to provide tooth space clearance (TSC) in the same manner as previously described.

Having thus described the preferred embodiments, the invention is now claimed to be:

1. A roller chain sprocket comprising:
   a plurality of sprocket teeth each having an engaging flank and a disengaging flank;
   the engaging flank cooperating with the disengaging flank of an adjacent sprocket tooth to form an asymmetrical tooth space for receiving a roller associated with a roller chain, the asymmetrical tooth space being defined by an engaging side roller seating angle (β) that is greater than a disengaging side roller seating angle (β'); and the asymmetrical tooth space including a flat surface positioned along the engaging flank to facilitate a staged impact between the roller and the sprocket, the staged impact including an initial tangential impact between the roller and the sprocket along the flat surface and a subsequent radial impact between the roller and the sprocket occurring after the initial tangential impact.

2. The sprocket of claim 1, wherein the roller chain has a chain pitch and the sprocket has a chordal pitch which is less than the chain pitch to facilitate the staged impact between the roller and the sprocket.

3. The sprocket of claim 1, wherein the asymmetrical tooth space incorporates an engaging flank pressure angle which is in the range of about −2.0° to about +5° to facilitate the staged impact between the roller and the sprocket.

4. The sprocket of claim 1, wherein the flat surface is tangent to an engaging flank radius at a radially outer end thereof, and tangent to a root radius at a radially inner end thereof.

5. The sprocket of claim 1, further including an inclined root surface positioned along the engaging flank to provide tooth space clearance, and a root surface having a radius tangent to the flat surface at one end thereof and tangent to the inclined root surface at the other end thereof.

6. The sprocket of claim 5, wherein the root surface radius is less that a roller radius.

7. The sprocket of claim 1, further including an inclined root surface positioned along the disengaging flank to provide tooth space clearance.

8. The sprocket of claim 1, further including a first inclined root surface positioned along the engaging flank, and a second inclined root surface positioned along the disengaging flank which cooperates with the first inclined root surface to provide tooth space clearance.

9. The sprocket of claim 1, wherein the roller is seated in two-point driving contact with the sprocket following the radial impact.

10. A unidirectional roller chain drive system comprising:
a driving sprocket including a plurality of sprocket teeth each having an engaging flank and a disengaging flank, the engaging flank cooperating with the coast flank of an adjacent sprocket tooth to define an asymmetrical tooth space having an engaging side roller seating angle (β) that is greater than a disengaging side roller seating angle (β');
a driven sprocket including a plurality of sprocket teeth each having an engaging flank and a coast flank, the engaging flank cooperating with the coast flank of an adjacent sprocket tooth to define an asymmetrical tooth space having an engaging side roller seating angle (β) that is greater than a disengaging side roller seating angle (β');
a roller chain having rollers in engaging contact with the driving sprocket and the driven sprocket; and
at least one of the driving sprocket and driven sprocket including a flat surface positioned along the respective engaging flank to facilitate a staged impact between a roller and the at least one of the driving sprocket and driven sprocket, the staged impact including an initial tangential impact between the roller and the at least one of the driving sprocket and driven sprocket along the flat surface and a subsequent radial impact between the roller and the at least one of the driving sprocket and driven sprocket occurring after the initial tangential impact.

11. The chain drive system of claim 9, wherein the roller chain has a chain pitch and the at least one of the driving sprocket and driven sprocket has a chordal pitch which is less than the chain pitch to facilitate the staged impact.

12. The chain drive system of claim 9, wherein the asymmetrical tooth space of the least one of the driving sprocket and driven sprocket has an engaging flank pressure angle which is in the range of about −2.0° to about +5°1 to facilitate the staged impact.

13. The chain drive system of claim 9, wherein the flat surface is tangent to an engaging flank radius at a radially outer end thereof, and tangent to a root radius at a radially inner end thereof.

14. The chain drive system of claim 9, wherein the asymmetrical tooth space of the least one of the driving sprocket and driven sprocket includes an inclined root surface to provide tooth space clearance, and a radial root surface tangent to the flat surface at one end thereof and tangent to the inclined root surface at the other end thereof.

15. The chain drive system of claim 14, wherein the root surface radius is less that a roller radius.

16. The chain drive system of claim 9, wherein the asymmetrical tooth space of the least one of the driving sprocket and driven sprocket includes an inclined root surface positioned along the disengaging flank to provide tooth space clearance.

17. The chain drive system of claim 9, wherein the asymmetrical tooth space of the least one of the driving sprocket and driven sprocket includes a first inclined root surface positioned along the engaging flank, and a second inclined root surface positioned along the disengaging flank to provide tooth space clearance.

18. The sprocket of claim 9, wherein the roller is seated in two-point driving contact with the at least one of the driving sprocket and driven sprocket following the radial impact.

19. A method of engaging a roller chain with a sprocket having a plurality of sprocket teeth including an engaging flank that cooperates with an adjacent tooth disengaging flank to form an asymmetrical tooth space for receiving a roller associated with the roller chain, and including a flat surface positioned along the engaging flank, the method comprising:
rotating the sprocket in a first direction so that the roller tangentially impacts the engaging flank along the flat surface; and
continuing to rotate the sprocket in the first direction so that the roller radially impacts a root surface of the sprocket a predetermined time period after impacting the engaging flank to spread the impact energy over the predetermined time period and reduce meshing noise levels.

20. The method of claim 19, further including:
after radially impacting the root surface, continuing to rotate the sprocket in the first direction so that the roller advances over an inclined root surface to facilitate maintaining the roller in hard contact with the root surface.

21. The method of claim 20, wherein the root surface is tangent to the flat surface at one end thereof and tangent to the inclined root surface at the other end thereof, and wherein a radius of the root surface is less that a roller radius.

22. The method of claim 19, wherein the roller chain has a chain pitch and the sprocket has a chordal pitch which is less than the chain pitch to facilitate the roller impacting the root surface after impacting the engaging flank.

23. The method of claim 19, wherein the asymmetrical tooth space incorporates an engaging flank pressure angle in the range of about −2.0° to about +5° to facilitate the roller impacting the root surface after impacting the engaging flank.

24. The method of claim 19, wherein the roller is seated in two-point driving contact with the sprocket after radially impacting the root surface.

* * * * *